United States Patent
Koster et al.

(10) Patent No.: US 11,575,787 B2
(45) Date of Patent: *Feb. 7, 2023

(54) ORIGINATING GROUP TEXT CALLS IN A CONTACT CENTER

(71) Applicant: Noble Systems Corporation, Atlanta, GA (US)

(72) Inventors: Karl H. Koster, Sandy Springs, GA (US); Jason P. Ouimette, Berkeley Lake, GA (US)

(73) Assignee: NOBLE SYSTEMS CORPORATION, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/392,053

(22) Filed: Aug. 2, 2021

(65) Prior Publication Data

US 2021/0368044 A1     Nov. 25, 2021

Related U.S. Application Data

(63) Continuation of application No. 16/684,861, filed on Nov. 15, 2019, now Pat. No. 11,082,558, which is a continuation-in-part of application No. 16/163,112, filed on Oct. 17, 2018, now Pat. No. 10,516,781, which is a continuation of application No.
(Continued)

(51) Int. Cl.
| | |
|---|---|
| *H04M 3/00* | (2006.01) |
| *H04M 3/51* | (2006.01) |
| *H04M 7/00* | (2006.01) |
| *H04M 3/42* | (2006.01) |

(52) U.S. Cl.
CPC ..... *H04M 3/5158* (2013.01); *H04M 3/42382* (2013.01); *H04M 3/5141* (2013.01); *H04M 7/0048* (2013.01); *H04M 3/5133* (2013.01); *H04M 3/5183* (2013.01); *H04M 2201/12* (2013.01)

(58) Field of Classification Search
CPC ........... H04M 3/5158; H04M 3/42382; H04M 3/5141; H04M 7/0048; H04M 3/5133; H04M 3/5183; H04M 2201/12
USPC ....... 379/265.01–265.14, 266.01–266.1, 309
See application file for complete search history.

(56) References Cited

U.S. PATENT DOCUMENTS

| | | | |
|---|---|---|---|
| 7,106,843 B1 * | 9/2006 | Gainsboro .......... | H04M 3/2281 455/411 |
| 9,998,595 B1 * | 6/2018 | Perdue ................ | H04M 3/5158 |

(Continued)

*Primary Examiner* — William J Deane, Jr.
(74) *Attorney, Agent, or Firm* — Blank Rome LLP

(57) ABSTRACT

A dialing list comprising call records can be processed by a call handling component(s) in a contact center in various dialing modes. A call record may be processed to originate a voice call, where the agent manually dials the call as a voice telephone call. In another embodiment, one or more call records can be processed to originate a SMS text call or group text call, where the agent also determines when the call(s) originates. The agent is presented with a graphical user interface tailored to the dialing mode. The dialing mode used may be defined by the dialing list the call record is retrieved from, information from within the call record itself, application of a rule, or input from the agent. The dialing mode may be altered under certain conditions. When the call is originated, various compliance oriented tests, including calling windows and call attempts, are performed.

20 Claims, 21 Drawing Sheets

Related U.S. Application Data

15/352,656, filed on Nov. 16, 2016, now Pat. No. 10,135,978.

(56) References Cited

U.S. PATENT DOCUMENTS

| | | | | |
|---|---|---|---|---|
| 2008/0260114 | A1* | 10/2008 | Siminoff | H04M 17/00 |
| | | | | 379/88.14 |
| 2014/0115486 | A1* | 4/2014 | Benson | G06Q 10/06 |
| | | | | 715/739 |
| 2014/0351757 | A1* | 11/2014 | De Bast | G06F 3/04817 |
| | | | | 715/817 |
| 2018/0351884 | A1* | 12/2018 | Pawelczak | H04W 4/12 |
| 2019/0362249 | A1* | 11/2019 | Rogynskyy | G06F 16/178 |

* cited by examiner

| | Manual Voice Dialing Mode | Today's Date: Sept. 21, 2015 |

| Disposition Voice Call | View Prior Message History | Switch to Text Dial | Switch to Voice Dial |
| 504 | 506 | 508 | 510 |

Name — John Doe

Number — 404-555-1212    (Dial Now)

Account Status — Payment Past Due/Min Payment of $56.23 due on 8/16/2015

Notes — Hearing Impaired; consider texting notification

560

561 — Disposition of Call

- 562 ☐ Answering Machine/Voice Mail
- 563 ☐ Busy
- 564 ☐ Promise to Pay
- 565 ☐ No Answer
- 566 ☐ Unable to Commit
- 567 ☐ Other (provide comment)

FIG. 5C

Manual Text Dialing Mode     Today's Date: Sept. 21, 2015

View Prior Contact History / Switch to Text Dial / Switch to Voice Dial

Name: John Doe

Number: 404-555-1212 [Copy]

Message Status: Awaiting to be Sent

Originating Number: 404-555-1212 ● Change Value

Account Status: Payment Past Due/Min Payment of $56.23 due on 8/16/2015

Notes

650

PRIOR CONTACT HISTORY [X]

| Date/Time | Sent/Received | Type/Contents |
|---|---|---|
| 6-30-2015 13:34 | S | PLEASE CONTACT US AT 800-555-1212 REGARDING YOUR CAR LOAN. |
| 6-30-2015 14:14 | R | I know I am late, give me a couple of days. |
| 7-3-2015 9:20 | S | *VOICE CALL* – CLICK <u>HERE</u> to listen |
| 7-3-2015 9:20 | R | *VOICE CALL* – CLICK <u>HERE</u> to listen |
| 6-30-2015 13:34 | S | PLEASE CONTACT US AT 800-555-1212 REGARDING YOUR CAR LOAN. |

○ Your payment of $____ was received today. Thank you.

[Dial Now]

FIG. 6B

ORIGINATING GROUP TEXT CALLS IN A CONTACT CENTER

CROSS REFERENCE TO RELATED APPLICATIONS

This application is a continuation of U.S. patent application Ser. No. 16/684,861, entitled "Originating Calls in a Contact Center", filed on Nov. 15, 2019, which is a continuation-in-part of U.S. patent application Ser. No. 16/163,112, entitled "Originating Calls in a Contact Center Either in Voice Dialing Mode or a Text Dialing Mode", filed on Oct. 17, 2018, issued as U.S. Pat. No. 10,516,781 on Dec. 24, 2019, which is a continuation of U.S. patent application Ser. No. 15/352,656, entitled "Originating Calls in a Contact Center Either in Voice Dialing Mode or a Text Dialing Mode", filed on Nov. 16, 2016, issued as U.S. Pat. No. 10,135,978 on Nov. 20, 2018, the contents of which are incorporated by reference for all that they teach.

BACKGROUND

Contact centers frequently have a need to communicate with individuals using different communication channels. Two common communication channels that may be used to contact an individual are voice telephone calls and Short Message Service ("SMS") texts. Conventionally, separate communications equipment has been used by agents in a contact center for originating communications using these different channels, e.g., to originate a voice call or send a text.

The disadvantages of using separate communications equipment are numerous. Separate systems usually require separate computer processing systems to be installed. This in turn, requires additional power, space, and air conditioning requirements. Additional administration and maintenance is also required to keep separate equipment operational.

In addition, using separate communication systems requires addition agent training and agent knowledge of how to use these additional systems. This requires additional time training for each agent. Until the agent is facile in operating both systems, a period of reduced agent effectiveness may occur. Further, these systems may have different user interfaces, which further reduces operational efficiency, since different procedures may be required by agents to perform similar tasks. Further, it is likely that operational errors may occur, since different procedures may be involved. In addition, different reporting structures/formats can be expected for these different systems, which complicates monitoring and enforcement of agent performance, operational aspects, and compliance enforcement.

Integration of disparate communication systems such as voice and text is not widely common, and there has been little, if any, motivation to integrate the operation of equipment involving these particular channels of voice and text. In the past, operation of such disparate, specialized systems may have been handled by different agents or groups, but using the same agents or groups promotes operational efficiency.

There is a growing need to coordinate communications on different channels to an individual for various regulatory reasons. Various regulations by the Federal Communications Commission ("FCC") have indicated that an SMS text is considered a call for certain purposes, similar to a voice call. For purposes herein, sending an SMS text is considered a "text call." Thus, some regulations limiting various aspects of voice calls from a contact center may apply to text calls. Thus, these specialized and disparate communication systems must be integrated in ways previously not anticipated. In other words, it is not merely using a common system for executing communication on different channels, but incorporating modifications in order to achieve the potential of the allowable benefits of integration. The level of integration and benefits thereof may vary based on the particular technology of the voice origination systems and the SMS text originating systems.

Therefore, there is a need to integrate disparate voice and text contact center origination technologies, so as to promote efficiency, agent usage, and compliance with current and potential future regulations in a cost effective manner. It is with these and other aspects in mind that the concepts and technologies developed herein are disclosed.

SUMMARY

In general, various embodiments disclosed herein allow an agent in a contact center to interact with an integrated communication system for purposes of originating either an outbound voice telephone call and/or a SMS text call to an individual associated with an account in a compliant manner, wherein both the telephone call and the SMS text call are processed so as to comply with various restrictions, such calling window restrictions and/or a maximum number of call attempts within a time period.

In one embodiment, a call record in a dialing list is processed by the integrated communication system in the contact center that selects the appropriate dialing component to process information and interact with the agent. In another embodiment, the agent is provided with the capability of altering the current dialing mode for that calling record. In either embodiment, the integrated communication system will ensure that any communication originated, whether a voice telephone call or an SMS text call, is compliant with the calling window restriction and/or the maximum number of attempts allowed.

As is discussed in greater detail below, the subject matter disclosed herein may be implemented as a computer-controlled apparatus, a method, a computing system, or an article of manufacture such as a computer-readable storage medium. These and various other features will be apparent from the following Detailed Description and the associated drawings.

This Summary is provided to exemplify concepts at a high level form that are further described below in the Detailed Description. This Summary is not intended to identify key or essential features of the claimed subject matter, nor is it intended that this Summary be used to limit the scope of the claimed subject matter. Furthermore, the claimed subject matter is not limited to implementations that address any or all disadvantages noted in any part of this disclosure.

BRIEF DESCRIPTION OF THE DRAWINGS

Reference will now be made to the accompanying drawings, which are not necessarily drawn to scale, and wherein:

FIGS. 5A-5C illustrate various embodiments of graphical user interfaces for an agent in a contact center interacting with a dialing component for manual origination of a voice call.

FIGS. 6A-6B illustrate various embodiments of graphic user interfaces for an agent in a contact center interacting with a dialing component for manual origination of a text call.

DETAILED DESCRIPTION

Figure 1:
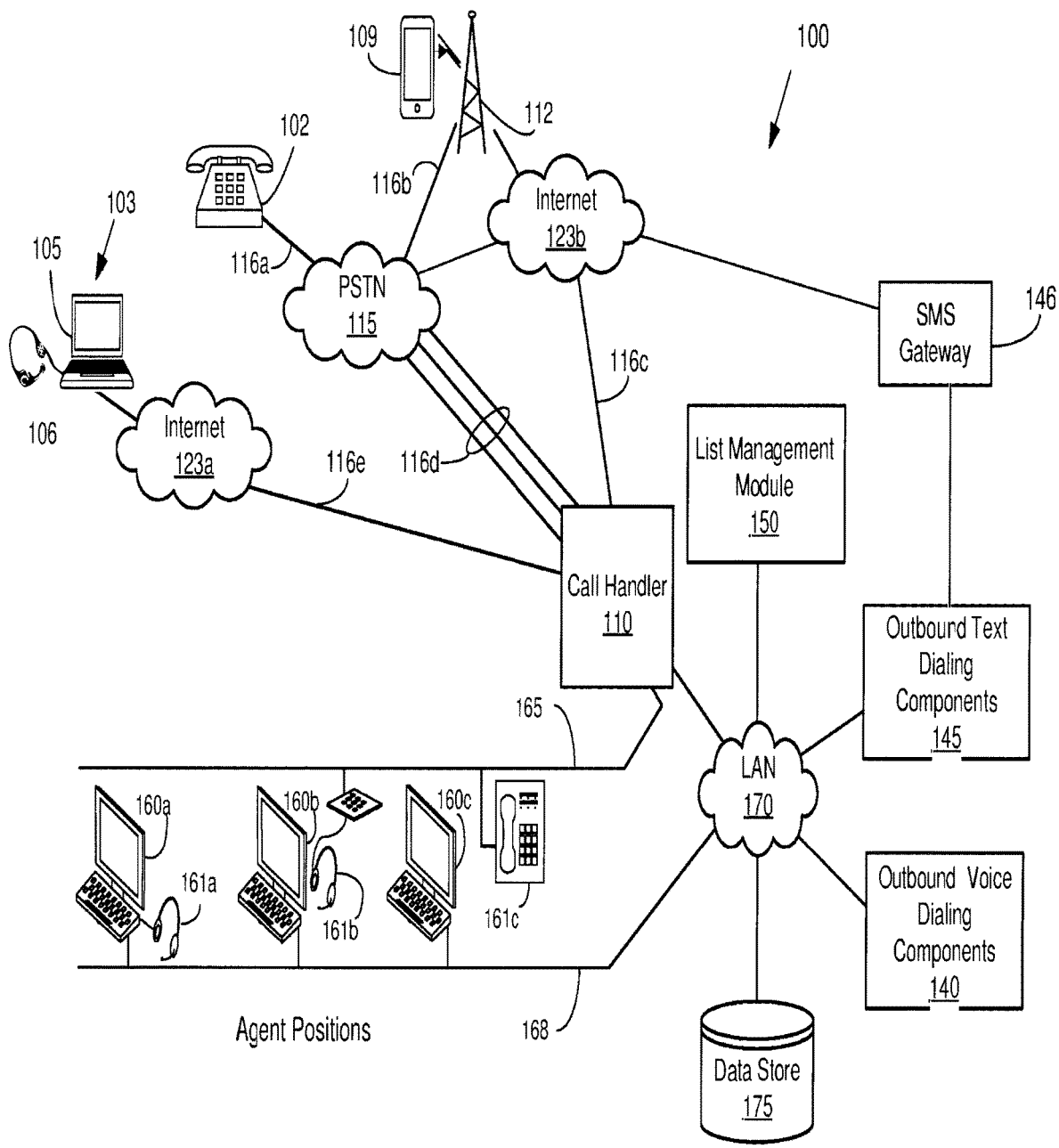
FIG. 1 illustrates one embodiment of an architecture comprising various voice and text components and modules used according to the concepts and technologies disclosed herein.

Various embodiments for practicing the technologies disclosed herein are described more fully hereinafter with reference to the accompanying drawings, in which some, but not all embodiments of the technologies disclosed are shown. Indeed, the embodiments disclosed herein are provided so that this disclosure will satisfy applicable legal requirements and should not be construed as limiting or precluding other embodiments applying the teachings and concepts disclosed herein. Like numbers in the drawings refer to like elements throughout.

The logical operations described herein may be implemented (1) as a sequence of computer implemented acts or one or more program modules running on a computing system or processing system, and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof. Greater or fewer operations may be performed than shown in the figures and described herein. These operations may also be performed in a different order than those described herein, while still achieving the overall purpose.

Contact centers may need to contact an individual (a.k.a. the "called party") using different communication channels. Different communication channels may include, e.g., voice telephone calls, emails, letters, faxes, SMS texts, social media, etc. For purposes of this disclosure, the different communication channels are limited to voice telephone calls and SMS texts (also referred to herein as simply "texts"). The voice telephone calls may comprise various forms of voice transmission, including analog-based telephone service, wireline based digital-based telephone service, or wireless (cellular) based telephone service. Thus, Integrated Services Digital Network ("ISDN") voice service, plain-old-telephone service ("POTS"), voice over Internet Protocol ("VoIP"), cellular voice services, etc., are all within the scope of voice telephone calls disclosed herein. The SMS text calls include the familiar text-based messaging service provided by cellular carriers to their subscribers wherein a text message can be transmitted to the wireless subscriber's mobile telephone number and displayed on the subscriber's smart phone.

While contact centers may contact a called party by originating a voice or text call, separate systems are involved, which present several disadvantages. From an administration and operational perspective, the separate equipment involves additional overhead. This requires maintaining separate processing servers, coordinating maintenance, providing additional power to multiple processing servers, providing additional air conditioning, and rack space. Thus, there are additional costs, time, and coordination required to accommodate additional device, as compared to equipment that is integrated.

More importantly, an agent in the contact center may have to interact with two separate and different communication systems in order to originate a voice call and a text call. This may involve two separate devices used by the agent, but may also involve using a single computer to access to separate systems using two user interfaces on the single computer. Thus, the agent may use a single desktop computer to access two separate systems, but the agent must be trained on the use and operation of the separate systems. This may adversely impact the agent's efficiency. Further, additional time may be required when switching from one system to another.

Even more importantly, the operations of these separate systems are not coordinated or integrated, unless additional efforts are expended in the contact center. Thus, originations of voice calls by a voice call processing system are logically separate and distinct from text calls originated from a text call processing system. This significantly increases the operational complexity in the contact center, since it may be required or desired to coordinate communication attempts across these separate systems. For example, a first agent using a voice call processing system may originate a voice call to a called party completely independently of a second agent using a text call processing system that originates a text call to the same called party. Nothing would prevent duplicate call attempts to the same party to occur by different agents using these separate channels. Yet, some states have regulations (as well as proposed federal regulations) which limit the number of call attempts that can be made to a debtor. For example, some states limit the number of calls to two per seven day period, which encompasses voice call attempts and texts.

Further, if the first agent originates a voice call and determines that the wireless number has been reassigned to a different wireless subscriber that was intended to be reached, nothing prevents the second agent from sending a text to that same wireless number, not knowing that the text will be sent to the incorrect party. In some embodiments, the sending of a text may not involve an agent, so it may not be possible for the first agent to inform the second agent of this condition or the system may not properly account for the number of communication attempts to the called party.

Thus, agent efficiency is diminished, the opportunity for mistakes increases, the opportunity for non-compliant calling increases, and additional costs and equipment may be required to effect the desired coordination. Further, the operational complexity to coordinate systems increases administrative efforts. For example, using disparate systems may require processing the results from a first communication system by an intermediate system so that the other communication system can be updated. This adds avoidable complexity.

All these disadvantages can be avoided, and the correlated advantages can be gained by designing an integrated voice-text contact center call origination system that provides a consistent user interface to the agent, allowing the agent to easily and seamless originate a voice call or text to a called party, with integrated compliance checking capabilities. This integrated system is intended to meet the specialized needs, equipment, and requirements of a contact center, which may be subject to various federal regulations involving tracking the number of communication attempts for various types of calls, which encompasses various channels, such as voice calls and text calls. This integrated system is distinct and distinguished from other systems targeted for non-commercial use that may integrate voice-text communications (e.g., such as a smart phone). Hence, the scope of the technologies and concepts herein are limited to contact center, or similar, environments, or that are used for various business purposes.

As noted above, the integrated system involves only voice and text communication systems, and does not pertain to integrating other forms of non-voice and non-text communications. Thus, no attempt should be made to construe the claims beyond the scope that one skilled in the art would interpret them in light of the specification.

Compliance Requirements

A contact center originating communications for particular business purposes may be subject to various regulations that would otherwise not apply for non-commercial, private communications. Hence, the need for providing a system for integrating normally disparate forms of communication is not required in a non-commercial, private communications context. Further, the need to coordinate compliance requirements for voice and text calls is unconventional, as these are traditionally viewed as disparate communication technologies.

Existing compliance requirements for originating certain voice calls include ensuring a call origination occurs within a prescribed calling window and that the calling attempt does not exceed an allowable number within a certain time period. This is sometimes simply referred to as the "calling window" and "call attempts" compliance requirement, respectively. Historically, these regulations have implicitly or explicitly referred to voice calls, but in the integrated communication system disclosed herein, the calling window and call attempts compliance requirements also apply to text calls, and furthermore, apply to the aggregate communications to a called party based on the voice and text communications.

The calling window refers to a time period during which it is allowable to originate a call to the called party. Based on the context, including the purpose of the call and the relationship of the calling and called party, the call may only be allowed to originate to the called party within a certain time period. In this case, the calling window is said to be open; if the calls cannot be made, then the calling window is said to be closed. Conventionally, this was based on the time the call was originated to the called party. In many instances, a default value of 8:00 a.m. to 9:00 p.m. may be assumed to be within the allowable calling window. These time values are in reference to the local time of the called party, not the local time of the contact center originating the call. Specifically, if the called party is located in California, which is in the Pacific Time Zone, then the corresponding calling window times for a contact center in the Eastern Time Zone is 11:00 a.m. to 12:00 a.m. (because there is a three hour time difference). (The time differential examples herein are typical, and may be modified in specific cases depending on application of daylight savings time.)

Ascertaining the time zone of the called party is sufficient to ascertain to know what times the contact center can originate calls to the called party. In other words, once the time zone of the called party is known, then it is easy to determine when the contact center can originate a call from another time zone. However, ascertaining the time zone of the called party may be challenging. One approach is to use the telephone number of the called party. Specifically, the area code and central office code may be used, which is the first six digits of the ten digit telephone number. The area code is sometimes designated as the "NPA" (for "numbering plan area", a.k.a. "area code"). The central office code is sometimes designated as "NXX" (reflecting that the "N" is a digit 2-9, and "X" is a digit from 0-9). Thus, this is sometime referred to as using the "NPA-NXX" to determine the calling window. This approach allows a geographic location to be determined using industry available databases. Specifically, the NPA-NXX allows determination of a central office location in an area code, which is a geographic location. Once this is known, then the time zone can be readily determined.

While the NPA-NXX can indicate a geographical location for wireline numbers, with the advent of mobile numbers, the NPA-NXX of the called party's number does not necessarily reflect their location and hence which time zone the called party is located in. The called party may have temporarily, or permanently relocated to another location in a different time zone. Thus, another approach to determine the location and hence time zone, is to use a residential address of the called party, if that is known. The zip code, for example, may be mapped to a certain geographical location and determining the local time zone is then readily possible. However, the called party may not be currently physically located at that address. They may be traveling, temporarily relocated, or otherwise reside in a different time zone.

Another approach is to use the narrower or more restrictive time zone that is based on the combination of the NPA-NXX and the party's residential address or postal address. This provides a narrow calling window, and takes into account the person may be likely in one of these two different locations. Another approach is to simply use a limited time window, namely 11:00 a.m.-9:00 p.m. (Eastern Time Zone) for originating calls. Using this time window ensures that regardless of where the called party is located in the continental U.S., their local time will be between 8:00 a.m. and 9:00 p.m. (local time). A narrower calling window can be used if Hawaii and Alaska are to be considered. Other calling windows can be used if other geographic areas are to be covered.

While originating voice calls in an allowable calling window is a common practice in contact centers, it is not a common practice to apply a calling window when originating text calls to a called party. Conventionally, a text is seen as not as intrusive as a telephone call, and hence there is no need to limit sending of certain texts with an allowable calling window defined for voice calls. Furthermore, unlike a telephone call, where the called party must answer or ignore the call, a text call is offered, optionally with an audible notification, but the called party may wait to view the text message.

With respect to call attempts, a contact center may attempt to reach a called party multiple times within a time period, assuming each prior communication is not successful. A successful communication may be defined as reaching the desired party (a.k.a. a "right party contact") or leaving a message on a messaging system (e.g., with a voice mail service or on an answering machine). Thus, a contact center may originate a voice call each day, or multiple times a day, until the call is answered by the desired party.

A contact center may have certain policies as to how frequently it will attempt a voice call. Based on the deployment of voice mail, answering machines, caller ID, and other technologies, a called party is usually aware if a call was received, even if the call was not answered. Many phones allow the called party to view a list of missed calls. If the called party reviews this list of call attempts that are too frequent, this can lead to charges of harassment or other regulatory violations, even if the calls are not answered. Unlike voice calls, a text call is presumed completed (and completed successfully), and hence the calling party should not repeatedly attempt to send a text. A sent text is presumed delivered, and the concept of voice mail or answering machines does not have an exact equivalent for text calls.

In the past, there was no need to coordinate origination of voice calls and text calls, as these are different channels of communication. However, integration of compliance requirements may dictate that the call attempts for both channel types are coordinated for a particular called party. Limiting a number of call attempts for a text message inherently involves a wireless number, as only wireless numbers can (conventionally) receive SMS texts. Consequently, there are several possible ways that limiting text calls can be defined. First, all limits of call attempts are understood to be within a time period. Thus, a limit may be defined as "X" calls in week or this may be simply defined as "X" calls if the time period is implicitly understood. Without a time period explicitly or implicitly indicated, there would be no resetting of the number of calls, and once the limit is reached, then presumably all calls would be banned. Consequently, it should be understood that the call attempt limit herein is always defined within some context of a defined time period, such as a day, week, or other interval, even if not explicitly indicated. For example, some regulations cap the number of voice and text calls to a debtor. One state limit is two calls per week, and another federal debt collection proposal limits the calls to no more than seven call attempts per week. In addition, once contact is made via a voice call, no more communications can be initiated to the debtor within a seven day window, absent consent from the debtor. Those skilled in the art will recognize that various limitations are defined that limit the number of attempts that can be made during a time period for debt collection purposes.

Limiting the number of text call attempts can be done in various ways. One approach is to limit attempts to a particular wireless number that is associated with the called party. Another approach is to limit the number of cumulative call attempts for text and voice calls made to that single wireless number. Thus, five call attempts to a wireless number could involve four voice calls and one text call, or three voice calls and two text calls. Another approach is to limit the number of cumulative call attempts for text and voice calls made to a plurality of numbers associated with the called party. Thus, if a called party has both a wireline and wireless number, the number of allowed texts to be sent to the wireless number may consider both the current cumulative number of voice calls to the wireline number along with the number of voice and text calls to the wireless number. Although the examples herein track the cumulative number of attempts for voice and text calls, other embodiments may track the number of attempts for a greater number of channels (including, e.g., email, faxes, etc.).

Exemplary Contact Center Environment

FIG. 1 illustrates one embodiment of a contact center architecture 100 that may be used in accordance with the various technologies disclosed herein. The contact center shown in FIG. 1 may process both voice and text calls. These calls may be inbound-only, outbound-only, or a combination of both (sometimes referred to as a "blended" contact center). Although many aspects of contact center operation are disclosed in the context of voice and text calls, in various embodiments, the contact center may process other forms of communication such as, for example, facsimiles, emails, video calls, and chat messages.

Since the contact center may handle calls originating from a calling party, or initiated to a called party, the term "party," without any further qualification, refers to a person associated with a either a text or voice call processed by the contact center, where the call is either received from, or placed to, the party. The term "calling party," if used, will generally refer to a party communicating with the contact center, but in many cases this usage is exemplary. Thus, use of the term "calling party" is not intended to limit the concepts to only inbound calls or voice calls, unless the context dictates such. Reference to the term "remote party" encompasses either a calling or called party.

Depending on the embodiment, inbound voice calls may originate from calling parties using a variety of different phone types. For instance, a calling party may originate a call from a conventional analog telephone 102 connected to a public switched telephone network ("PSTN") 115 using an analog plain old telephone service ("POTS") line 116a. The voice calls may be routed by the PSTN 115 and may comprise various types of facilities 116d, including, but not limited to: T1 trunks, SONET based fiber optic networks, ATM networks, etc. Various types of routers, switches, bridges, gateways, and other types of equipment may be involved in the processing of the voice calls.

Inbound voice (and text) calls may also originate from a mobile phone device 109, such as a smart phone, tablet, or other mobile device, which wirelessly communicates with a mobile service provider ("MSP") 112. The voice calls may be routed to the PSTN 115 using an integrated services digital network ("ISDN") interface 116b or other types of interfaces that are well known to those skilled in the art. In particular embodiments, the MSP 112 may also route calls as packetized voice, referred to herein as voice-over-IP ("VoIP") to an Internet provider 123b using Internet-based protocols, such as session initiated protocol ("SIP"). For convenience, unless indicated otherwise, the term "trunk"

refers to any type of facility 116c, 116d, or 116e providing calls to, or from, the contact center, regardless of the type of protocol or technology used. Specifically, a "trunk" is not limited to time-division multiplexing ("TDM") technology nor is it limited to providing voice carriage, but may also include text data.

Inbound voice calls may also originate from a calling party employing a so-called "IP phone," "VoIP phone," or "soft phone" 103. In one embodiment, this device may comprise a computing device 105, such as a laptop, computing tablet with a cellular interface, or other electronic device, which interfaces with a headphone/microphone combination, also referred to as a "headset" 106. An IP phone may use a digital voice control protocol and may process packetized voice data according to various Internet based voice protocols, such as session initiated protocol ("SIP"), Megaco (a.k.a. MGCP), or H.323 developed by the International Telecommunications Union ("ITU") and the Internet Engineering Task Force ("IETF"). The voice call may be conveyed by other types of Internet providers 123a, such as a cable company providing Internet access services over a coaxial cable facility 116e. Those skilled in the art will recognize that a variety of protocols and facilities may be used to convey voice calls.

The term "telephone call" as used herein is generally synonymous with a "voice call" unless indicated otherwise. Further, the term "telephone call" may encompass a voice call using any form of currently available technology and/or originating from any type of device, such as a soft phone 103, a conventional telephone 102, a mobile phone 109, or other device known in the art. The term "call" as used herein referring to a voice call may encompass an active instance of two-way voice communication, an attempt to establish two-way voice communication, or a portion of the two-way voice communication. For example, a user at a conventional telephone 102 can dial a telephone call in an attempt to establish two-way communication, and a call can be said to be made even prior to establishment of a two-way connection.

In another example, a voice call may be put on hold, and a portion of the voice call may be referred to as a "call leg" existing between the caller and certain equipment, or between two pieces of equipment. A voice call may comprise a number of concatenated or joined call legs, which may involve various components at their end-points, as known to those skilled in the art. A voice call leg may also be unidirectional or bidirectional with respect to the ability to convey speech. In certain contexts, which will be made explicit, the call may encompass communications other than voice, for example, it may be a text call. Unless stated otherwise, a call is either a voice call or a text call.

In various embodiments, inbound voice calls from calling parties to the contact center may be received at a call handler 110, which could be, in one embodiment, an automatic call distributor ("ACD"). In particular embodiments, the call handler 110 may be a specialized switch for receiving and routing inbound voice calls under various conditions. Further, the call handler 110 may be embodied as a dedicated form of equipment readily available from various manufacturers that is able to receive and originate voice calls, such as a dialer (or predictive dialer) or PBX. The call handler 110 may be a so-called "soft switch" comprising a suitable programming module executed by a processing device to perform the necessary functions. The call handler 110 may route an incoming voice call over contact center facilities 165 to an available agent. Depending on the embodiment, the facilities 165 may be any suitable technology for conveying the voice call, including but not limited to a local area network ("LAN"), wide area network ("WAN"), ISDN, or conventional TDM circuits. In addition, the facilities 165 may be the same or different from the facilities used to transport the voice call to the call handler 110.

In various embodiments, voice calls may be routed over facilities 165 to an agent for serv1cmg. That is, for example, the party may speak with an agent to receive customer service. The physical area at which the agent sits is often referred to as an agent "position" and these positions are often grouped into clusters managed by a supervisor, who may monitor calls and the agents' productivity. An agent typically uses a specially configured computing device 160a-160c, such as a computer, and a voice device 161a-161c that is adapted for various contact center functions associated with processing communications. The combination of computing device 160a-160c and voice device 161a-161c may be referred to as a "workstation" or "workstation computer." Thus, for these particular embodiments, the workstation collectively has a data capability and a voice capability, although separate devices may be used. In some instances, "workstation" may be used in reference to either the data or voice capability at the agent's position. For example, "routing the call to the agent's workstation" means routing a call to one of the voice devices 161a-161c at the agent's position. Similarly, "routing the voice call to the agent" means routing a voice call to the appropriate equipment at an agent's position. The workstation computer typically has a display, which may be used to convey information to the agent about the calls, and the agent may interact with the call handler using a mouse or other pointing device with the display.

In particular embodiments, the voice device 161a-161c used by an agent may be a soft phone device exemplified by a headset 161a connected to the computer 160a. The soft phone device may be a virtual telephone implemented in part by an application program executing on the computer 160a. Further, the phone may also comprise an Internet Protocol ("IP") based headset 161b or a conventional phone 161c. Use of the term "phone" is intended to encompass all these types of voice devices used by an agent, unless indicated otherwise.

Agents typically log onto their workstations prior to handling voice or text calls. The workstation may also communicate this to the call handler. This allows the contact center (including the call handler) to know which agents are available for handling calls. In particular embodiments, the call handler 110 may also maintain data of an agent's skill level that may be used to route a specific call to the agent or group of agents having the same skill level. In particular instances, if a suitable agent is not available to handle a voice call, the call handler 110 may queue the call for the next available agent. As can be expected, various algorithms may be employed to process calls in an efficient manner.

In various embodiments, two types of signaling information may be provided with an inbound voice call that may be used by the call handler 110 in processing the voice call. The first type of signaling information indicates the telephone number dialed by the calling party, and is frequently referred to as "DNIS," for voice calls, derived from the Dialed Number Identification Service associated with this capability. For example, in particular instances, a contact center may provide various services, such as sales, customer service, technical support, etc., each of which may be associated with a different telephone number (e.g., multiple toll free "800" numbers). In these instances, the call handler 110 may use the DNIS to determine the purpose of the voice call, and potentially identify a group of agents having the appropriate skill level to handle the voice call. Thus, in various embodiments, the call handler 110 may prioritize and route voice calls to an agent based on the required skill level. Skills-based routing may be a rule-based set of instructions that the call handler 110 uses to handle voice calls. Depending on the embodiment, skills-based routing may be implemented by the call handler 110, or by the call handler 110 interacting with a computer-telephone integrated ("CTI") server (not shown).

The second type of signaling information that may be provided with an inbound voice call is the calling telephone number, often referred to as automatic number identification ("ANI") or the "calling party number." In particular embodiments, the call handler 110 and/or CTI server may use the ANI of an incoming voice call to retrieve caller information from a data store 175 and provide the data to an agent's workstation computer 160a-160c over facilities 168 along with routing the voice call to the agent's workstation phone 161a-161c. Further, in particular embodiments, the ANI may also be used to ascertain a party's status (e.g., a "Gold Level" customer warranting premium service), determine whether consent has been received by a party for particular services or actions, and/or to facilitate the call handler 110 routing the voice call to a select group of agents. Depending on the embodiment, the data store 175 may include one or more databases storing different information such as, for example, records of caller information. Further, the data store 175 may be integrated with the call handler 110 or segregated as a standalone medium or media. In the case of an outbound call, the contact center includes the calling party number in communication it originates, which in the context of the called party, is the ANI.

In various embodiments, the call handler 110 may place a voice call (either an inbound or outbound call) in a queue if there are no suitable agents available, and/or it may route the voice call to an interactive voice response system (e.g., server) ("IVR") (not shown) to play voice prompts. In particular embodiments, these prompts may be defined to be in a menu type structure and the IVR may collect and analyze responses from the party in the form of dual-tone multiple frequency ("DMTF") tones and/or speech. In addition, the IVR may be used to further identify the purpose of the voice call, such as, for example, prompting the party to enter account information or otherwise obtain information used to service the call. Further, in particular embodiments, the IVR may interact with other components, such as the CTI server or the data store 175, to retrieve or provide information for processing the call. In other configurations, the IVR may be used to only provide announcements.

Depending on the embodiment, the interaction and voice audio transmitted between the various components shown may involve using a local area network ("LAN") 170. However, other configurations are possible, such as, but not limited to, using a wide area network, wireless network, router, bridge, direct point-to-point links, etc. Thus, in lieu of facility 165 for conveying audio to the agents, the facilities associated with the LAN 170 may be used.

In particular embodiments, when an agent is interacting with a called or calling party, the agent may use his workstation computer 160a to further interact with other enterprise computing systems, such as, for example, a customer relationship management ("CRM") server (not shown). A CRM server may be used to integrate information from various enterprise business systems to facilitate the agent servicing the call. In addition, the CRM server may provide a variety of applications.

In addition to receiving inbound communications, including, for example, voice calls, the contact center may also originate communications to a called party, referred to herein as "outbound" communications. In some embodiments, the call handler 110 may be able to originate calls and be embodied as a dialer, such as a predictive dialer, that originates outbound voice calls at a rate designed to meet various criteria. The predictive dialer may then connect an agent at a workstation with the outbound voice call via a call leg after the remote party answers. Similar to the other components within the contact center architecture 100, depending on the embodiment, the dialer may comprise one or more software modules executing on a processing device hardware platform.

In various embodiments, the call handler 110 is configured to dial a list of telephone numbers to initiate outbound voice calls. Thus, in some embodiments, the call handler 110 may include functionality for originating voice calls, and if so, this functionality may be embodied e.g., as a private automatic branch exchange ("PBX" or "PABX") or a dialer. Further, in other embodiments, the call handler 110 may directly interface with voice trunks using facilities 116c, 116d, and 116e to the PSTN 115 and/or Internet providers 123a, 123b for originating calls. After the calls are originated, a transfer operation by the call handler 110 may connect the call with an agent or a queue, or in some instances the IVR. In various embodiments, the call handler 110 may make use of one or more algorithms to determine how and when to dial a list of numbers, or a sub-list of numbers from the list, so as to minimize the likelihood of a called party being placed in a queue while maintaining target agent utilization.

In other embodiments, the contact center may comprise voice dialing components 140 for originating voice calls. In this case, the call handler 110 largely functions to only receive incoming voice calls, while the outgoing voice calls originate from the outbound voice dialing components 140. The voice call may be communicated to the LAN 170, and from there it may be connected directly to the communication facilities 116e (not shown), or indirectly via the call handler 110, which serves as a gateway to the communication facilities 116e (as shown).

The outbound voice dialing components 140 may be integrated into the call handler or other components, or may be modules comprising software executing on microprocessors or other processing systems separate from the call handler 110. The outbound voice dialing components 140 may originate voice calls in an individual manner or in a batch (group) manner. This refers in part to the degree of agent involvement and how call records are processed. When originating voice calls in an individual manner, the voice calls may originate in response to the agent responding to individual account information presented to the agent from an individual call record. This information may be presented to the agent using a user interface on the agent's computer. Thus, in a manual dialing voice mode, the agent controls directly or indirectly the origination of each voice call on a call-by-call basis. When the outbound voice dialing components 140 originate one or more voice calls without agent involvement on a call-by-call basis, then this is a form of group voice call establishment. The agent may interact using a different user interface. An example of this is when a predictive dialer processes multiple call records in a dialing list and based on agent availability or planned availability, originates multiple voice calls without the agent individual controlling the origination. The outbound voice dialing components 140 may also comprise separate components for predictive dialing and for manual dialing.

The contact center may also comprise separate text dialing components 145 for originating (and potentially receiving) text calls. The outgoing text calls could be originated by these text dialing components 145 where the text calls are sent to the Internet 123b directly (not shown), or indirectly through some call handler 110 or a SMS gateway 146 The text dialing components 145 may also interface with a mobile service provider 112, instead.

The outbound text dialing components 145 may executing as a module in the same physical processors as the call handler 110, outbound voice dialing components 140, or may be in a stand-alone processing system (not shown). The outbound text dialing components 145 may interact with an agent via the LAN 170 and the facilities 168, allowing presentation of the text call received, or receiving a text call originated by the agent using workstation 160a. The outbound text dialing components 145 may originate calls with an agent user interface that is similar to the outbound voice dialing interface, but adapted for text calls.

The outbound text dialing components 145 may offer two modes for originating text calls. A manual individual text dial mode may allow the agent to interact with a single call record and cause the origination of the text call to the party associated with that call record. The agent may also select the contents of the text call and the calling party number used when the text call is originated. In another mode, which will be discussed further below, the agent may direct the originating of a group of text calls, where the agent does not cause each individual call to originate, but causes the group of calls to be originated. In this mode, the processing of call records from the dialing list is in a group, whereas in the manual individual text dialing mode, the processing of call records is typically on an individual call record, one-at-a-time. The origination of a group of text call is not limited to occurring only once. An agent can invoke the sending of a group text several time during their shift. This frequently occurs to facilitate sending a smaller number of texts, where the texts invite the recipient to callback. Sending out a large number of texts inviting a callback could overwhelm the agent and result in the callers being queued. Thus, various strategies may be devised for controlling how many sub-groups of a larger group may be sent out and when, for a particular agent's shift.

As is evident, there are various dialing modes. In this embodiment disclosed, there are two dialing modes for voice calls and two dialing modes for text calls. In other embodiments, a lower level of differentiation may be created so that there are three or four types (or more) of voice dialing modes. For example, the voice dialing mode that involves processing records on an individual basis may have a pre-view voice dialing mode and an agent manual dial voice dialing mode. A power-dial dialing mode could be defined. For purposes of illustration, four distinct dialing modes are described, two for voice and two for text, but those skilled in the art will recognize that additional dialing modes could be defined.

The list management module ("LMM") 150 manages the dialing lists and may be cognizant of the dialing modes. The LMM may process a dialing list so as to generate a number of sub-dialing lists, which are segregated for each dialing mode and then provided to the appropriate dialing mode components. In various embodiments, multiple sub-dialing lists may be generated and provided throughout the day to the appropriate components. Or, the LMM may process a single (master) dialing list and transfer each individual call record to the appropriate dialing mode components. More will be discussed about the LMM below.

Finally, the data store 175 is where the dialing lists may be stored and retrieved. The LMM 150 may retrieve the dialing list initially from the data store, and may store various process sub-lists back into the data store. Thereafter, the sub-lists may be retrieved when needed from the data store. The data store 175 may also store the results of the voice and text calls. Other information required to assist the agent in establishing a voice or text call may also be stored in the data store 175. For example, various campaign level information may be stored in the data store. This may include, e.g., configuration parameters that are to be used for a calling campaign associated with a particular sub-list or dialing mode. More information about such campaign level or dialing mode parameters are discussed below.

Although a number of the above components may be variously referred to as a "server," each may be also referred to in the art as a "computing device," "module", "unit", "system", or "sub-system." A server may incorporate a local data store and/or interface with an external data store. Use of the word "server" does not require the component to interact in a client-server arrangement with other components, although that may be the case. Further, the above components may be located remotely from (or co-located with) other components. Furthermore, one or more of the components may be implemented on a single processing device to perform the functions described herein. For example, in various embodiments, one or more functionalities of the call handler 110 or other component may be combined into a single hardware platform executing one or more software modules. In addition, the contact center architecture 100 may be provided to contact centers as a hosted solution, where the call processing functionality is provided as a communication service (a so-called "communication-as-a-service" or "CaaS") to a contact center operator. Thus, there is no requirement that the servers identified above actually be located or controlled by a contact center operator.

In addition, depending on the embodiment, the agent positions may be co-located in a single physical contact center or multiple physical contact centers. The agents may be remotely located from the other components of the contact center, and may also be remotely located from each other, sometimes referred to as a "virtual contact center." In particular instances, a virtual contact center may describe a scenario in which agents work at home, using their own computers and telephones as workstations. In some configurations, a single physical location of the contact center may not be readily identifiable. For instance, this may occur when the call processing functions are provided as a service in a hosted cloud computing environment and the agents positions are in their individual residences. It is even possible for the supervisor to be remotely located (e.g., work at home), and such an arrangement does not negate the existence of the contact center.

Dialing List Processing and Dialing Modes

FIG. 2 is useful for explaining the basics of how a dialing list may be processed relative to various dialing modes that may be employed. Turning to FIG. 2, an overview 200 of the contact center dialing modes are depicted. As noted earlier, four distinct dialing modes are discussed, though there could be a greater or fewer number in other embodiments. To recap, the dialing modes are divided into voice and text dialing modes, which reflects how call records are processed and the agent interacts with the dialing component. Other embodiments may vary from what is shown.

A dialing list 205 comprises a series of call records, each of which includes information about an account. The dialing list 205 may be stored in the data store 175, along with other information used by the contact center. Reference to an "account" is made since in many applications the enterprise operating the contact center considers each record to be associated with an existing or potential customer. However, the term "account" is also used to refer to information that may not technically involve an existing or potential customer, such as a medical patient, a charitable donor, etc. Thus, use of the term "account" is not limited to a customer in a sales-type application. Reference to an "account" also conveys that additional information may be included, other than just a telephone number to be dialed. The information included in each record may vary, and may include the called party's name, address, account history, various communication channel information, such as type of channel, address used, frequency of interaction, communication preference information, etc. This may include historical information about what channels were used in the past, how often, results of the call attempt, etc.

The dialing list 205 may comprise a set of call records which include various types of telephone numbers and are associated with various dialing modes. In various cases, the dialing mode for a call record may be limited by the type of number in the call record. For example, a voice and text call may be made to a wireless number, but a wireline number typically can only receive a voice call. In various embodiments, as will be discussed, the dialing list may have a homogeneous structure of only one type of dialing mode or one type of number, whereas in other embodiments, the structure may be disparate, e.g., the dialing list includes call records associated with different dialing modes and/or different telephone numbers. In other embodiments, the dialing list may be a master dialing list actually comprising two or more sub-lists, which are logically or physically distinct from a master dialing list. In other embodiments, the dialing list may comprise call records which are segregated by time of day, or day of week. That is, the dialing list may be a list of all records to be called between 6:00 p.m. and 8:00 p.m., or on a certain day. Typically, however, the call records in the dialing lists require additional processing by the LMM 150, before the call records are distributed to the various corresponding dialing components.

The dialing list 205 may be created on a daily or otherwise periodic basis. Typically, a dialing list will be prepared based on business needs, and is sent to the contact center for processing and call origination. The list management module ("LMM") 150 is shown as receiving and processing the dialing list 205. One function that may be performed by the LMM is segregating the various call records in some manner. At a high level, this may segregate the call records according to their dialing mode. However, another function performed by the LMM may involve ascertaining whether a call attempt can be made based on various rules that may limit the number of call attempts within a certain time period. This function may also involve ascertaining a location of the called party, so as to ascertain a local time zone so that the called party may be contacted within an allowable calling window. Further, this function may involve screening (a.k.a. "scrubbing") the list of call records to against another database to identify any records that should not be called, or otherwise segregated.

For example, the dialing list may be "scrubbed" which involves checking each record against a list of individuals who have previously been named as a TCPA plaintiff. The dialing list may also be scrubbed against a list of state or federal do-not-call list of numbers, which reflect individuals that have requested not receiving telemarketing calls. In another example, the dialing list may be processed so as to segregate wireline numbers from wireless numbers. Or, the dialing list may be processed so as to segregate wireline non-VoIP numbers from wireline VoIP numbers. Other possible approaches for processing the dialing list are possible. The exact form of scrubbing performed is dependent on the context and application. For example, if the dialing list is not used for telemarketing calls, then there is no need to scrub it against a list of individuals requesting to be exempt from telemarketing calls.

As mentioned, the LMM 150 may process the dialing list so as to segregate the dialing list, if necessary, according to dialing mode for each record. "Dialing mode" refers to how the call is originated. FIG. 2 illustrates four distinct dialing modes, although other embodiments may have a greater or fewer number. FIG. 2 illustrates two dialing modes for originating voice calls to wireline and/or wireless numbers and two dialing modes for originating text calls to wireless numbers, for a total of four.

A voice call may be originated in a predictive dialing mode by using a predictive dialing component 215. The use of predictive dialers is well known in the industry. The predictive dialing mode is characterized as dialing "ahead of" the availability of an agent. That is, calls are originated in expectation of an agent being available to be connected to an answered call. The predictive dialing component 215 represents the equipment and/or software modules that implement predictive dialing. In other embodiments, other forms of dialing modes may be substituted in this example that process a number of call records without agent intervention for each record.

A voice call may also be originated as a manual voice dialing mode, which 1s accomplished using the manual voice dialing component 220. As evident, there is a close correlation between the type of dialing components and the associated dialing mode they implement. The manual voice dialing component may be a single component, or a set of components, which an agent interacts with for purposes of dialing a voice call for each call record (one record at a time), wherein a non-automatic telephone dialing system ("ATDS," a.k.a. an autodialer) may be used for the predictive dialing mode. Both the predictive dialing component 215 and the manual voice dialing component 220 may process wireline and wireless numbers in call records for originating voice calls. However, the manual voice dialing mode is typically used for voice calls to wireless numbers on an individual call record basis, where consent has not been obtained for using an autodialer.

There may be other forms of voice dialing modes which could be used, but which are not depicted in FIG. 2 in the voice dialing components 140. A "preview" dialing mode allows the agent first view information about an account and then indicate when the call should be made. Another form, called "power" or "progressive" dialing mode automatically dials a number from the dialing list whenever an agent is available. In various implementations, the predictive dialer component 215 may also implement these dialing modes. Thus, a dialing component may implement different dialing modes.

In addition to voice dialing modes, FIG. 2 shows two text dialing modes. These two text dialing modes include the manual individual text dialing mode and the group text dialing mode. The manual individual text dialing mode is implemented by the manual individual text dialing component 225. This dialing mode allows the agent to originate an SMS text to a called party indicated in the call record on an individual call record basis. This dialing mode uses the manual individual text dialing component 225 which is not considered to be an ATDS, in part because the agent intervenes to cause each text call to originate. In that respect, the manual individual text dialing mode parallels the manual voice dialing mode in that each dialing mode allows a single call to a telephone number to be made without employing an ATDS, but differs in that the former originates a text call and the latter originates a voice call.

The group text dialing mode is implemented using the group text dialing component 230. In one embodiment, this dialing mode allows a plurality of SMS texts to be sent out to a group of call records in the dialing list. Typically, in this mode, each call is not originated in response to an individual agent's intervention. Rather, the agent may cause a rule to be defined which is applied automatically by the dialing component to all call records in the dialing list to originate the text calls. In this mode, the contents of the SMS texts are frequently based on pre-determined contents. The SMS text contents may be all the same, or selected from a number of pre-determined messages. The group text dialing mode allows a large list of SMS texts to be sent out to a dialing component without significant agent intervention for each call record. The equipment for implementing this dialing mode, the group texting dialing component 230 may be an ATDS. In other embodiments, the group texting dialing mode is used to allow the agent to send out a smaller sized list (a sub-list). The agent may send out a number of sub-lists throughout their shift, as appropriate. This smaller sized list could comprise, e.g., 8, 16, or 32 records at a time. For example, a debt collector could form a group text dialing list for an agent, and select sub-portions to provide to the agent to send out at various times. If the texts are used invite debtors to call back to the agent, then sending out the sub-list at periodic intervals facilitates avoiding overwhelming the agent with callbacks from the debtors responding to the texts.

Although the text dialing components 145 are shown as separate components, they can be integrated so that a single component executes two modules that provide both dialing modes, or a single module that provides both dialing modes. In other embodiments, these dialing modes may be integrated with the voice dialing mode components 140.

In all four of the dialing modes, various processing functions ensure that the voice call or the text call originated complies with various limitations and regulations, including calling windows and call attempts. Specifically, when sending an SMS text call, a check is made to ensure that the SMS text is sent within the allowable calling window with respect to the called party. In addition, in each of the dialing modes, another check is made to ensure that sending the SMS text does not exceed an allowable number of call attempts within a certain time period.

Each of the dialing modes may be implemented on components that are separate and distinct for the various dialing modes, or may be implement using common components relative to other dialing modes. For example, although FIG. 2 shows four sets of dialing components for implementing the four corresponding dialing modes, a single dialing component system may implement two, three, or all four dialing modes.

Further, each dialing mode typically has a distinct graphical user interface ("GUI") that is presented to the agent, and with which the agent interacts with (even if the different dialing modes are implemented on the same component). The distinct GUI screens, however, may incorporate common aspects, so as to retain the same "look and feel." Thus, a GUI screen for a manual voice dialing mode may be similar in many respects to a manual text dialing mode.

The different GUIs for the different dialing modes reflect the distinctions associated with each dialing mode. For example, a manual voice dialing mode may present the agent with a dial pad for indicating a telephone number to be dialed, whereas with a predictive dialing mode, there is no need for this to be presented to the agent. Similarly, the GUI for the manual individual text dialing mode may present the agent with options to select/edit/compose the message contents for each record, whereas the group texting dialing mode may only allow the agent to select a message for all call records. Other distinctions may be applicable, as discussed below.

Figure 2A:
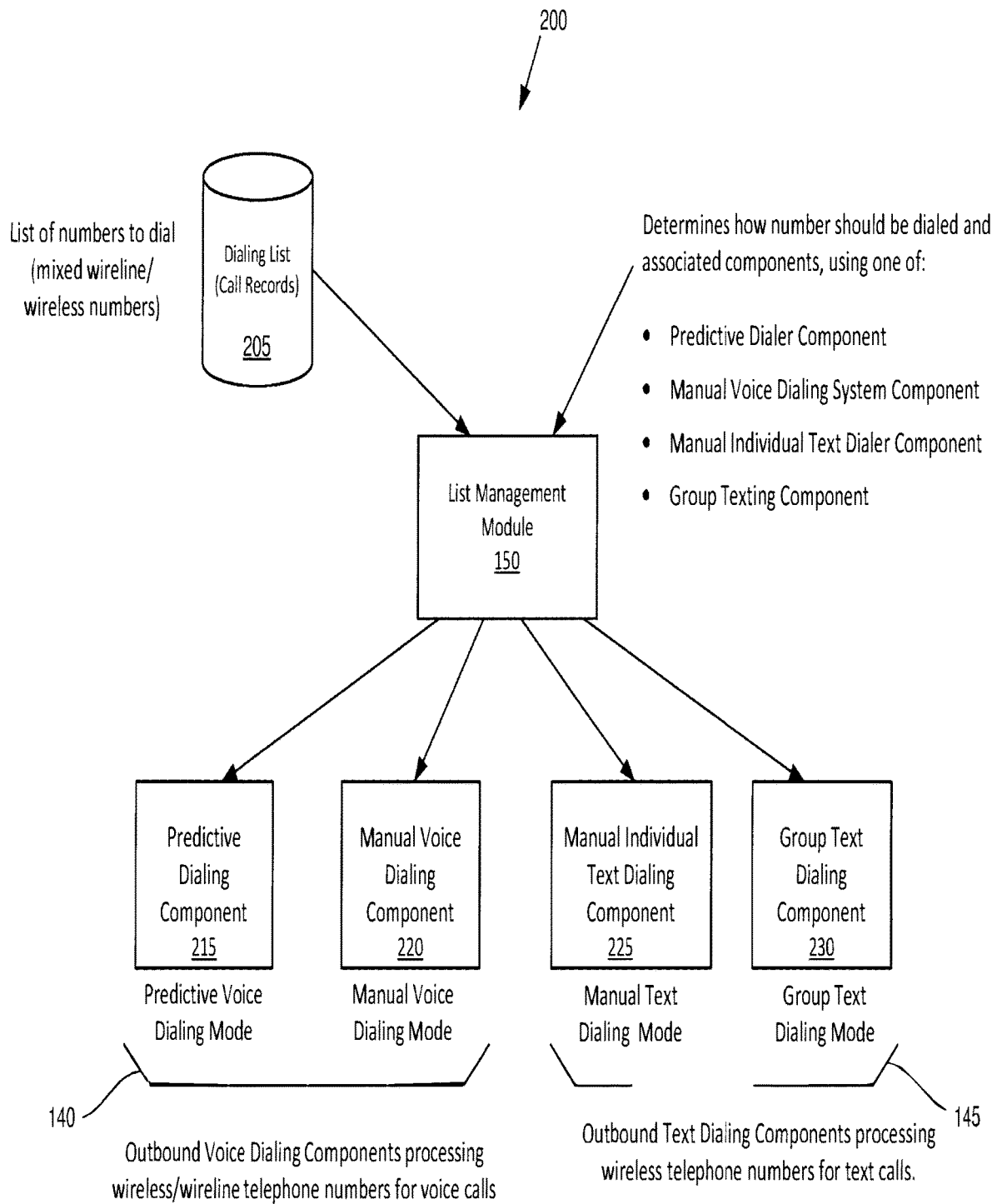
FIG. 2A illustrates further details of one embodiment of an architecture comprising the list management module and various voice and text dialing components used according to the concepts and technologies disclosed herein.
Figure 2B:
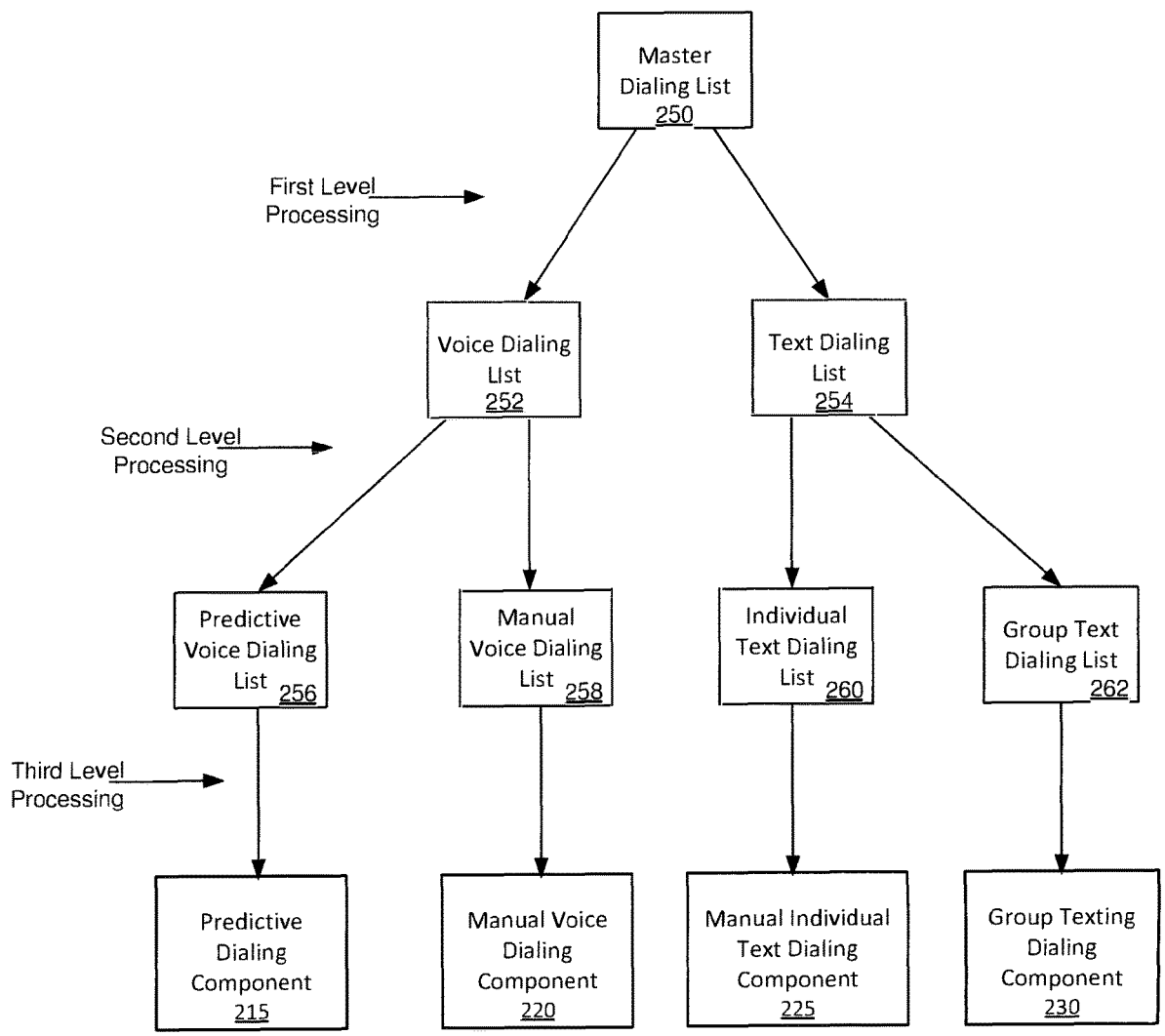
FIGS. 2B-2C illustrate embodiments of how the list management module may process a dialing list according to the concepts and technologies disclosed herein.
Figure 2C:
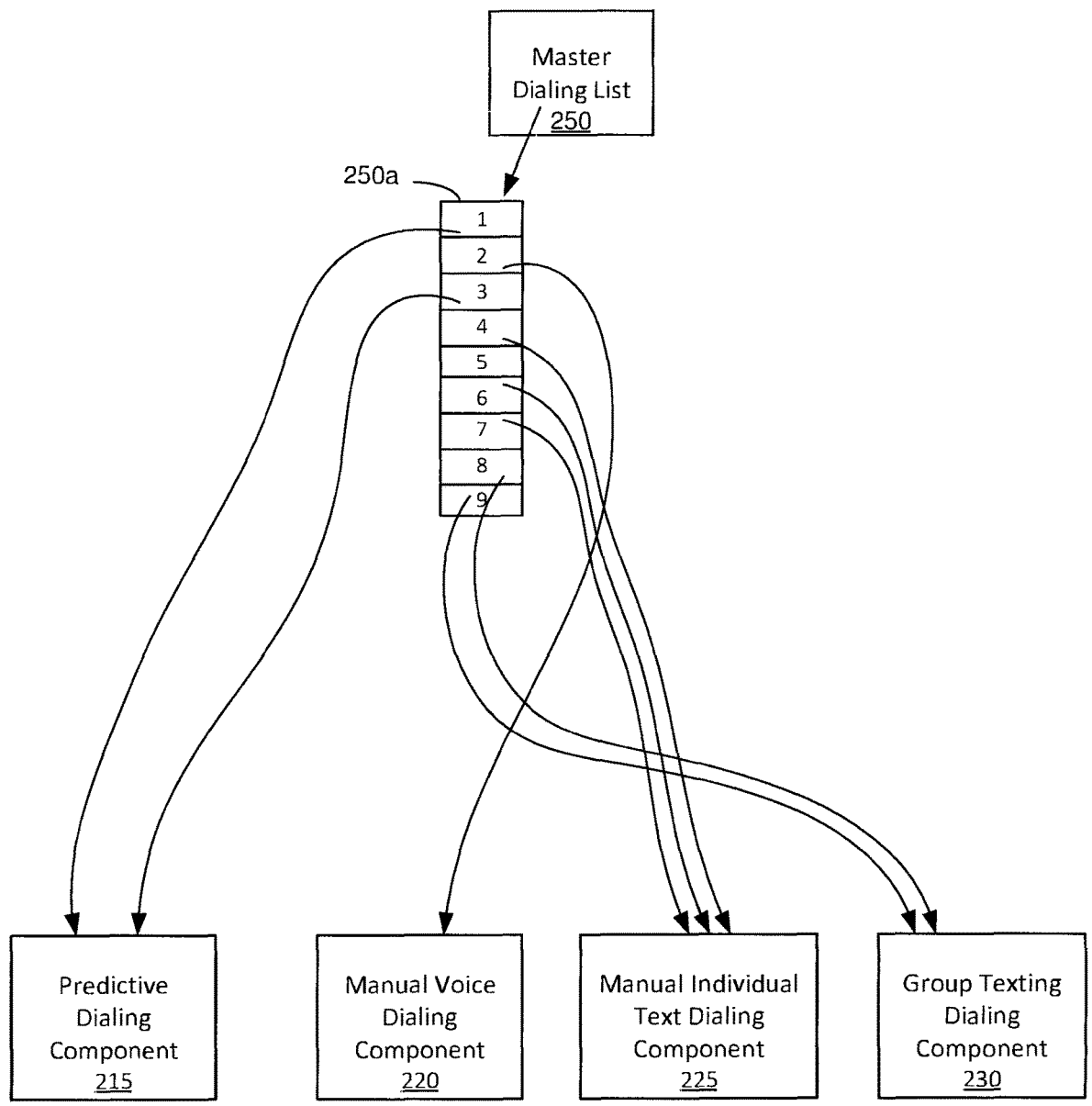

The LMM 150 may process the dialing list in various ways, which are illustrated in part in FIGS. 2B and 2C. Turning to FIG. 2B initially, this process illustrates how the LMM can apply various levels of processing to generate various sub-lists. Specifically, the master dialing list (so called because it contains all the call records) 250 is processed so as to segregate the call records which are to be voice dialed from those that are to be text dialed. Thus, the result is that a voice dialing list 252 and a text dialing list 254 are generated. In this embodiment, each of these interim lists are further processed in a second level of processing. Namely, the voice dialing list 252 is further processed to segregate those voice dialing records that are to be predictively dialed and manually dialed. Thus, the result is that a predictive voice dialing list 256 and a manual voice dialing list 258 are generated. Each of these lists are then sent in a third level of processing to the appropriate dialing components. Specifically, the predictive voice dialing list 256 which is to be dialed in a predictive voice dialing mode is sent to the predictive dialing component 215. Similarly, the manual voice dialing list 258 is sent to the manual voice dialing component 220.

Similarly, the text dialing list 254 is segregated into a list of call records that is to be individually text dialed, creating the individual text dialing list 260. A group text dialing list 262 is also created. Each list is then sent to the corresponding dialing component namely the manual individual test dialing component 225 and the group texting dialing component 230.

This example shows how the LMM can generate the various sub-lists and transmit them to the corresponding components. This example shows records in all four dialing modes, thus resulting in four sub-lists. In other embodiments, there may be fewer (or greater) than four dialing modes. For example, sub-lists could be generated for predictive dialing and group texting, and sent to the corresponding components. In another embodiment, a list of call records to wireless numbers can be segregated into a manual voice dialing list and an individual text dialing list.

Another approach that the LMM may use for processing a master dialing list is shown in FIG. 2C. In FIG. 2C, the LMM processes the master dialing list 250, which comprises a series of call records 250a, one at a time. Thus, the first call record (labeled with a "1"), is analyzed and sent to the predictive dialing component 215. Next, the second call record is analyzed and sent to the manual voice dialing component 220. Each record is sequentially analyzed and based on the dialing mode, it is sent to the component handling the corresponding dialing mode. In other embodiments, a group of call records (e.g., 32 at a time) can be selected, analyzed, and transmitted, whereafter another group is selected and processed.

The generation of sub-lists shown in FIG. 2A may be well suited for any dialing mode. However, it is particularly suited for the dialing modes which process groups of call records. A predictive dialing mode, for example, may initiate a number of calls when an agent or agents are expected to be available. Sending call records to the predictive dialer one at time would simply result in the predictively dialer having to cache the call records until a sufficient number were available to dialer. Thus, it is typically more efficient to send the entire a group or a portion thereof to dialer components that are processing groups of records.

On the other hand, sending an entire sub-list of call records to be manually dialed to a manual dialing component (either voice or text) may introduce operational complexities. For example, if there are two manual dialing components working in parallel, then sending the entire sub-list to one of the components would obviously not allow the other dialing component to function. Thus, in some embodiments, it may be desirable to send each record individually to a manual dialing component as shown in FIG. 2C.

It is even possible to combine aspects of FIGS. 2B and 2C in a hybrid approach. For example, the LMM could process a master dialing list to segregate out all call records belonging to a predictively voice dialing sub-list and a group texting dialing sub-list. These two sub-lists would then be sent to the respective dialing components as a group. Next, the LMM may then process the remaining call records (which are to be individually dialed) in the master dialing list one record at a time, sending each record to its corresponding dialing component, as the dialing component is able to accept more records. This would allow the LMM to manage multiple dialing components of the same type, or decide how to determine a dialing mode based on the dialing component's status. In other embodiments, the LMM may fetch a group of records from a particular list, and process them as a group or individually, and then repeat the process.

The LMM may transmit a record (either individually or in a list) to a particular dialing component for dialing in a certain mode, but the agent may have the ability to alter the dialing mode. Thus, for example, a call record may be provided to a manual voice dialing component 220, but the agent may determine that it would be preferable or more effective to send an SMS text. In this case, the agent can switch dialing modes, which would allow sending an SMS text to that call record. It can be envisioned that the opposite could occur, e.g., a call record is provided to an agent in a manual individual text dialing mode, but the agent switches to a manual voice dialing mode. Of course, there are various limitations that must be respected when switching dialing modes. For example, a voice call to a wireless number may be switched to a text dialing mode to that wireless number, but the same is not possible if the voice call is to a wireline number. As it well known, a wireline telephone number cannot receive SMS texts. Similarly, a manual individual text dialing mode may not be able to be switched over to a predictive dialing mode. If consent from the called party has not been obtained, then that wireless number cannot be predictively dialed using a predictive dialer, which may be considered as an autodialer. Further, switching a single record from manual voice dialing to predictive voice dialing may not provide any operational benefits.

The switching from one dialing mode to another is facilitated if the dialing modes are implemented using common components. For example, if the manual voice dialing mode and the manual individual text dialing component are implemented on the same dialing component, then switching from one mode to another does not require transmitting the call record from one dialing component to another dialing component. On the other hand, if implemented using separate dialing mode components, then the call record has to be conveyed from one dialing mode component to another. This may require passing the call record back to the LMM, which then sends it to the other dialing mode component, or the dialing component may send it directly to the other dialing mode component.

The switching from one mode to another may be suggested or restricted by the LMM or some other module or system. For example, the LMM may analyze the prior contact history for an account, and present it to an agent for manual voice dialing, and inform the agent that manual individual text dialing is an allowable alternative dialing mode. Or, the LMM may inform that the individual may prefer text dialing, or may prefer not to receive a text, and hence the dialing mode cannot be changed. As will be seen, there are various factors that may impact whether an agent (or some other process) can switch the initially suggested or selected dialing mode.

Figure 3:
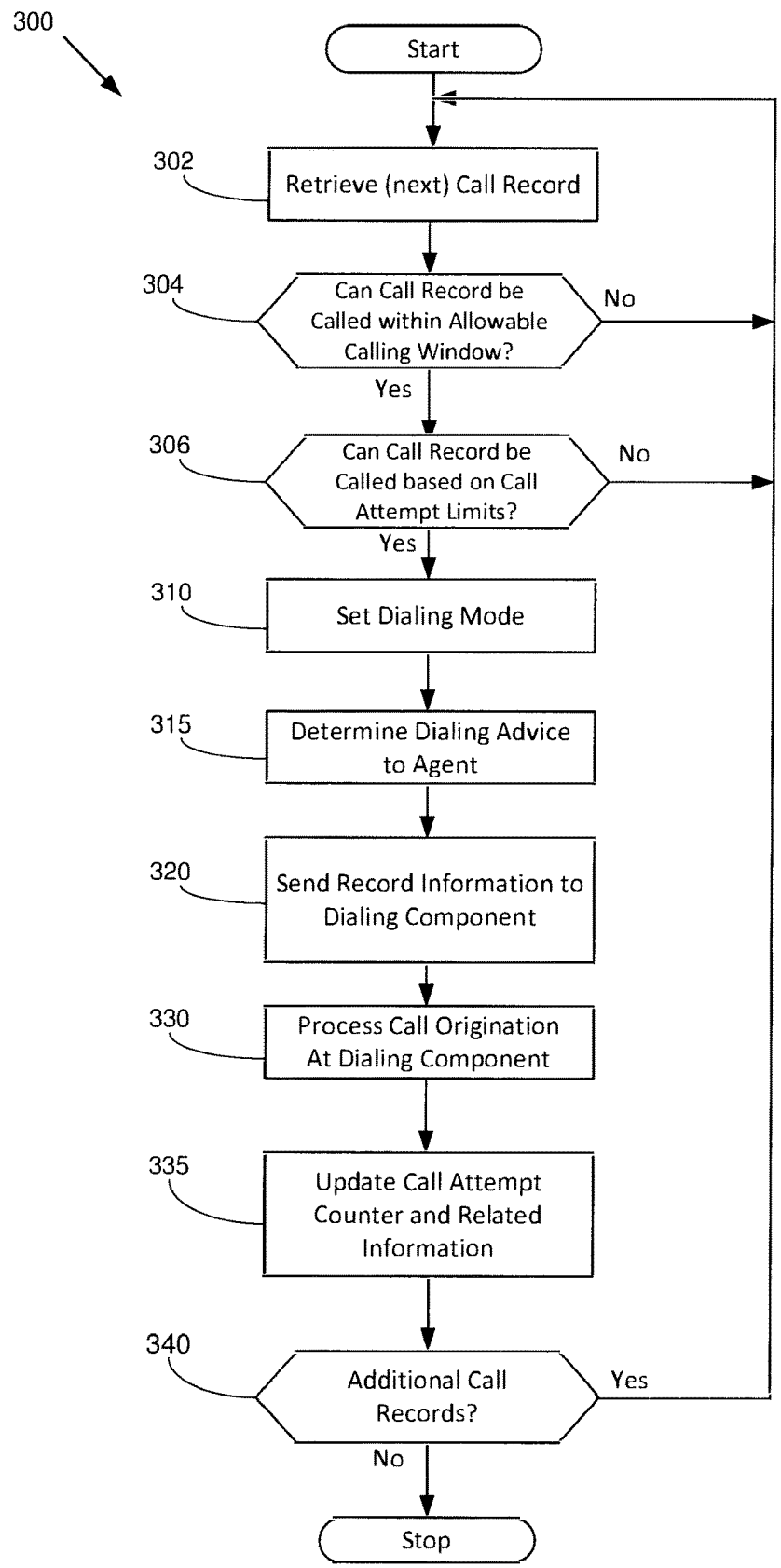
FIG. 3 illustrates one embodiment of a high level process flow for processing a call record in a dialing list in a contact center according to a dialing mode.

FIG. 3—High Level Call Record Processing

Turning to FIG. 3, the process 300 illustrates at a high level the processing involved for each call record for originated the call. This embodiment is based on the LMM performing some of the functions discussed below, but as it will be seen, some of the functions may be also performed in the corresponding dialing component.

The process begins with the LMM retrieving the next call record (a.k.a. "dialing record") from the dialing list in operation 302. This may be the next call record in a sub-list previously generated by the LMM or it may be the next record in the master last. In this embodiment, the LMM may perform compliance checking functions shown in operations 304 and 306. Namely, the LMM may check whether the number can be called is within the allowable calling window 304 and whether the number can be called based on call attempt limits 306. If neither of these is possible, then the next record is retrieved in operation 302. In other embodiments, this function may be performed by the dialing component.

Assuming that the number can be called, the dialing mode is determined in operation 310. This may be based on various factors, including information contained in the call record itself. Other embodiments may analyze or involve other data, apply a predictive modeling algorithm, or employ other techniques for ascertaining the dialing mode. The LMM may also provide dialing advice to the agent in operation 315. This may include information as to whether the dialing mode can be switched to another dialing mode.

The LMM then transmits the call record information to the selected dialing component in operation 320. The LMM may, in some instances, provide information to the dialing component indicating which agent, or group of agents are to be used in handling the call. Once the dialing component receives the information, it may then process the call record and originate the call in operation 330. The appropriate call attempt counter is updated to reflect that a communication attempt was made in operation 335. Any other call status information or information related to the call record is updated as appropriate as well at this point. This information may reflect, e.g., what message or originating telephone number was used when originating the text, the disposition of the call, etc.

If there are additional call records in the dialing list in operation 340, then the process returns to operation 302 where the next call record is retrieved, and the process is repeated. If there are no more records in the list, then the process is completed.

The compliance operations of checking for an allowable calling window in operation 304 and checking the current call attempt limits in operation 306 may be performed, alternatively, in the selected dialing component. Thus, operations 304 and 306 could occur in conjunction with operation 330 in the dialing component. Those skilled in the art will recognize that other exclusion checks could be performed in the dialing component that could result in preventing the call origination to occur. For example, other call exclusions could be based on scrubbing the telephone number in the call record against a "do not call" list. Or, a lack of consent from the called party in regarding the use of an autodialer could impact the selection of the dialing mode, or result in prohibiting the dialing of the call based on the selected dialing mode (i.e., it is an autodialer and therefore it should not originate the call). This could be indicated in the call record and used to select the dialing mode. In other cases, there may be information contained within the call record indicating that the calls are to be made on certain days or time of day (e.g., inconvenient calling windows) for certain channels. Thus, the processing shown in operation 304 and 306 are but two of the types of compliance related processing that could be applied to prevent a text or voice call from originating to the telephone number in the call record.

Further, as will be seen, the determination of the dialing mode, and the corresponding dialing components used to originate the call, may depend on various factors and rules. For example, in the prior examples, application of the inconvenient times indicated by the called party could be used to select a particular dialing mode. Similarly, the determination of the SMS text contents, as well as the originating number used for texts and/or voice calls, may also depend on various factors and rules. Further examples are provided herein.

Figure 4:
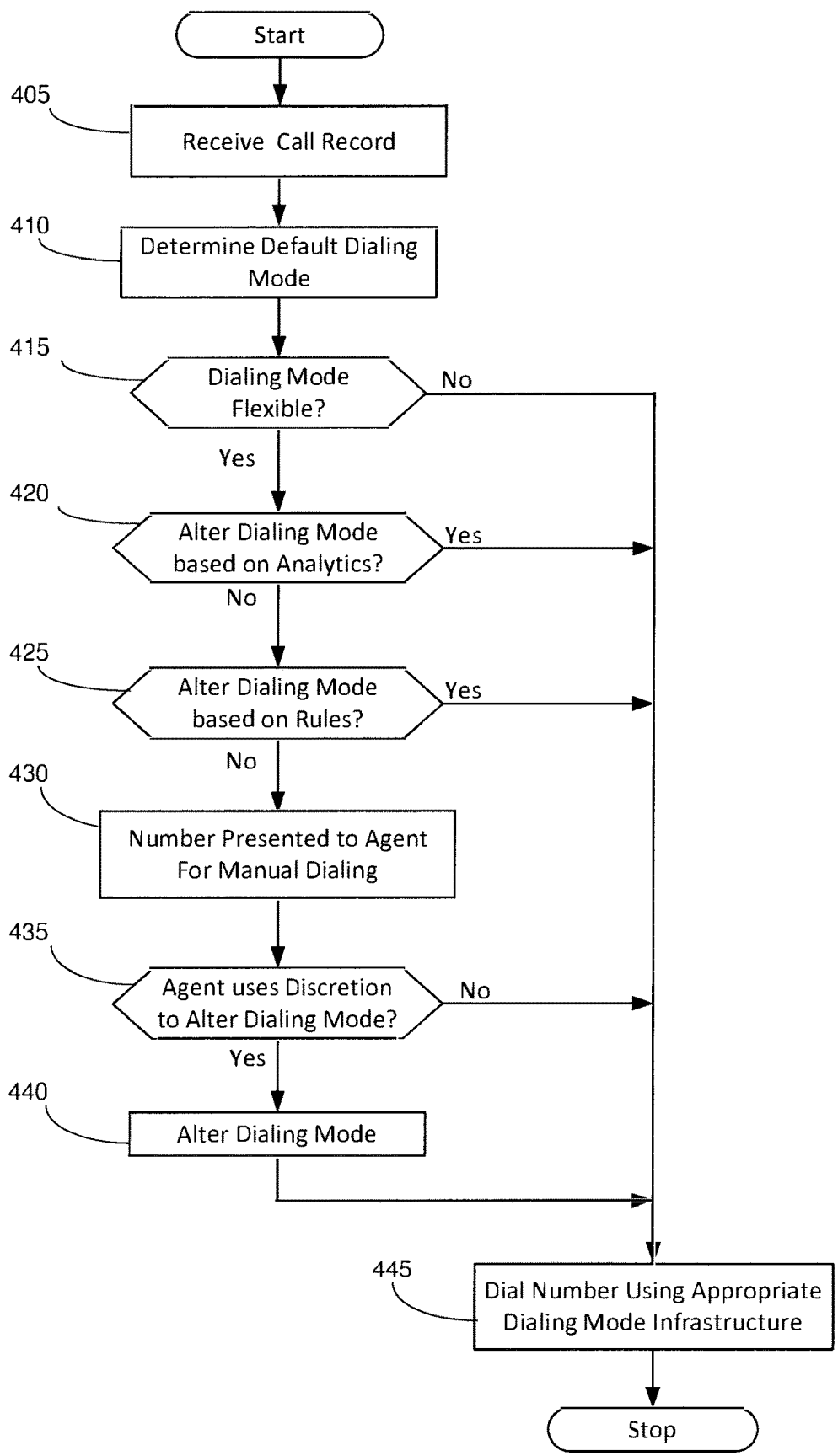
FIG. 4 illustrates one embodiment of a process flow in a contact center altering the dialing mode initially selected for a call record.

FIG. 4—Switching the Dialing Mode

A call record in a dialing list may have an initial association with a dialing mode. This association may be implicit or explicit. For example, a list of call records may be implicitly association with voice dialing, and provided to the voice dialing components. This was described above when the LMM generates a sub-list by dialing mode. In other embodiments, each call record may have an explicit indication as to the type of dialing mode. Or, other information, such as a permission indicator, may be used to select a dialing mode. Once the dialing mode is determined, the record is provided to the corresponding dialing mode component. This process is referred to herein as "selecting" or "determining" the dialing mode. While this process may determine an initial dialing mode, this does not mean that the dialing mode cannot be subsequently changed.

Once the call record is received by the appropriate dialing component, i.e., the dialing mode has been selected, it is possible to alter the dialing mode. This is referred to as "switching" or "altering" the dialing mode. Switching the dialing mode can be triggered in various ways and can be initiated by the dialer component itself, by the application of various algorithmic type processing, or it can be initiated by the agent interacting with the dialing component. The former two cases can be referred to as an automatic switching of the dialing mode and the latter can be referred to as manual switching of the dialing mode.

FIG. 4 illustrates one embodiment of a process flow illustrating how the dialing mode may be switched after the initial dialing mode has been determined. Typically, the switching of a dialing mode refers to switching the dialing mode for a particular record from a manual voice dialing mode to a manual individual text dialing mode, or vice versa. However, switching could also be applied to a group of call records.

In the process flow of FIG. 4, the call record is received in operation 405. This may be received by the dialing component by fetching it from the LMM or fetching it from cache memory in the dialing component. An initial or default dialing mode is determined, potentially based on the call record in operation 410 or other data implicitly indicating the default dialing mode. At this point, various processes may be implemented for switching the dialing mode. The processes shown henceforth in FIG. 4 may occur in a different order and may include a greater or fewer number of tests than what is illustrated.

The first test in operation 415 is a determination of whether the dialing mode can be switched, e.g., is the dialing mode flexible? Various information may indicate whether it is even possible to switch the dialing mode. If it cannot, then the process proceeds to operation 445 where the number is dialed using the initially selected dialing mode and related infrastructure.

If it is possible to alter the dialing mode in operation 415, then a subsequent test in operation 420 may alter the dialing mode based on application of analytics, e.g., application of a predictive model. Information about the account may be analyzed in light of other historical data for calls made to that account or other similarly situated accounts. For example a predictive model may analyze the account to determine if the called party would be more receptive to receiving a text instead of a voice call, or whether the called party may response more positively to a voice call instead of a text. This analysis may depend on the purpose of the communication. For example, if the purpose of the call is to remind the called party of an appointment, then a text call may be just as appropriate or effective as a voice call. The analysis may also take into account the costs associated with originating a voice call versus text call. Hence, an analysis of the account may maintain the initially selected dialing mode (whether it be voice or text). However, if the purpose of the call is e.g., to obtain acceptable of an offer or to schedule an activity based on the affirmance of the called party, a text mode call may be altered to a voice call instead, as the model may predict that the necessary acceptance or affirmance is more likely to be obtained on a voice call as opposed to sending an SMS text. Hence, the model may suggest altering the dialing mode from text to voice. However it may be determined, if the dialing mode is altered in operation 420, then the number may be dialed m operation 445 according to the selected dialing mode infrastructure.

If the application of analytics does not alter the dialing mode in operation 420, it is possible that some other basis may result in altering the dialing mode. For example, in operation 425, the application of a rule may alter the dialing mode. The application of a rule is a deterministic algorithm based on the known information of the account, which typically does not involve statistical analysis of historical data to determine the outcome. However, the development of the rule may involve statistical analysis of historical call data. Some examples will illustrate some examples of how a dialing mode may be switched.

In one embodiment, a call record may be switched based on a random number generator, a defined percentage, or information maintained in the call record. A test to compare performance or marketing results may involve alternating each record for voice and text dialing. For example, 100 call records could be processed so that 50 are voice dialed and 50 are text dialed so as to compare called party responses. This may be implemented by switching each dialing mode for each records. Or, a counter could be deployed so that the first 50 records are voice dialed and the next 50 are text dialed. Or, a random number generator could be used to determine which dialing mode is used. In other embodiments, a percentage of calls could be defined—e.g., 25% are voice dialed and 75% are text dialed. Each of these examples involves application of a rule, but does not necessarily involve statistical analysis of other call data.

In other embodiments, information from the record is used to determine how the dialing mode is selected/altered. Called parties residing in one state or zip code could be voice dialed whereas other called parties may be text dialed. Called parties having a certain account characteristic (e.g., high level of past purchases, high level of debt owed, past due status, etc.) could be switched to a voice dialing mode whereas others are switched to a text dialing mode. Thus, various criteria and thresholds could be used to determine the dialing mode at this stage.

If the dialing component does not alter the dialing mode, then the dialing component will present the number for manual dialing to the agent in operation 430. Note that at this point, the number may be presented to the agent for manual text or voice dialing. However, the agent may determine to alter the dialing mode in operation 435. If the dialing mode is not altered by the agent, then the process proceeds to operation 445 where the number is dialed with the selected dialing mode. If the agent does alter the dialing mode in operation 435, then the process proceeds to operation 440 where the agent switches the dialing mode for this call record. Then the process proceeds to operation 445 where the number is dialed with the appropriate dialing mode component infrastructure.

It is evident from FIG. 4 that the dialing mode may be altered automatically (e.g., without human involvement) or manually (e.g., with human involvement) by the agent instructing a change in the dialing mode. Further, while altering a dialing mode implies an initial selection of a dialing mode, it is evident that the dialing mode initially determined in operation 410 may be preliminary or tentative. That is, operation 410 may be eliminated and the operations 420-435 may determine the dialing mode. However, it is obvious that at some point prior to originating the call, the dialing mode must be determined one way or the other.

The ability of the agent to manually switch the dialing mode may be limited in certain cases. Doing so may require some degree of integration or sharing of common components by the voice dialing mode and the text dialing mode. The agent may be presented, for example, with a GUI screen that facilitates switching from a manually dialed voice call to a manually dialed text call, or vice versa. Various embodiments of such GUI screens are discussed below. If separate systems and components are used for these different dialing modes, the coordination between these components may be more complicated.

Agent Graphical User Interface Screens for Manual Dialing

Figure 5A:
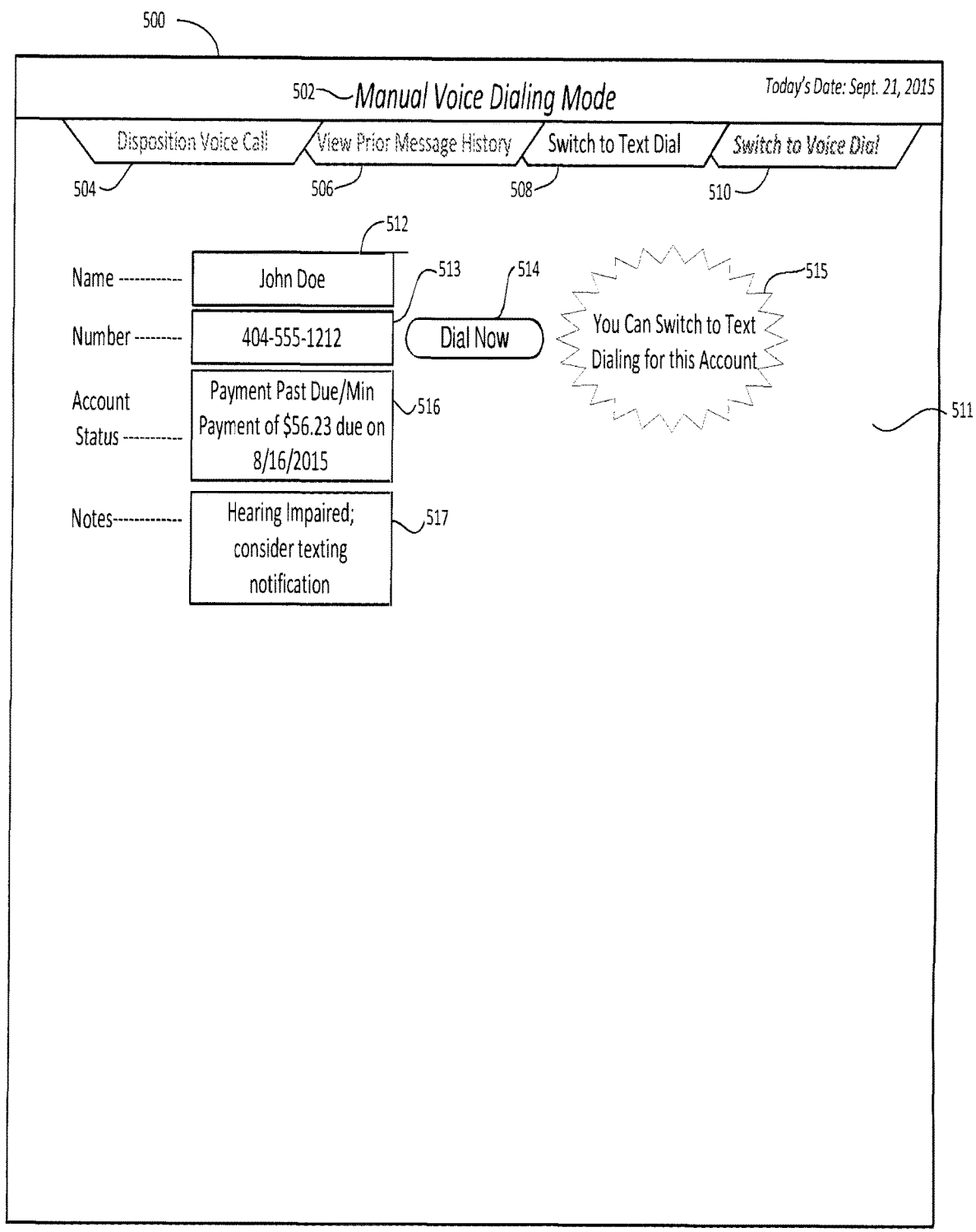

The flexibility of allowing the agent to switch dialing modes, as well as provide a flexible format for each dialing mode is now addressed. Turning first to FIG. 5A, an embodiment of graphical user interface is shown for an agent in a contact center interacting with a dialing component for manual origination of a voice call. The screen 500 presents some of the information that an agent may be presented with in originating a manual dialed voice call. Note that additional icons and information may be presented, and the illustration herein focuses on the information and icons associated with switching modes. In other embodiments, additional icons, commands, and information would be presented to the agent.

The screen indicates the current dialing mode 502, so that the agent knows at all times the current dialing mode. A series of control icons, shown in this embodiment as tabs 504, 506, 508, and 510, are available for the agent to request or perform various actions or functions. One of the tabs 508 allows the agent to switch the dialing mode. The main portion 511 of the screen displays additional account specific information from the current call record, such as the name of the called party 512, the telephone number 513, account status information 516, and other notes 517. In this case, the notes 517 indicate information to the agent which may be useful for the agent deciding whether to manually switch the dialing mode. Further, information 515 may be presented informing that agent that this particular call record can be switched from a manual voice dialing mode to a manual text dialing mode. If the agent determines to voice dial the account (e.g., without switching dialing modes), then a function icon 514 can be invoked which instructs the system to manually dial the number 513.

Figure 6A:
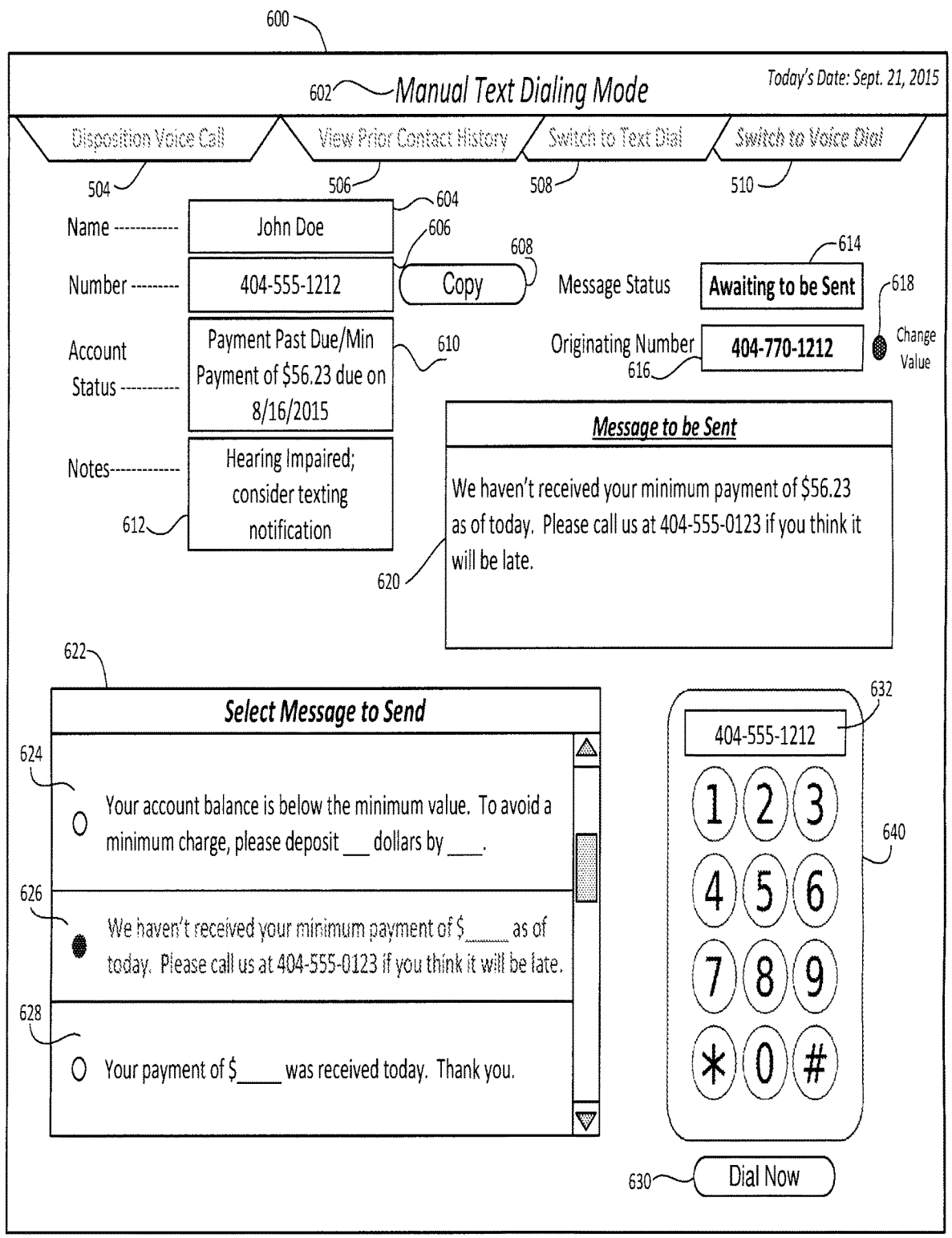

Note that in other embodiments, the GUI may present the agent with an icon comprising a keypad, similar to the keypad 640 depicted in FIG. 6A, which is associated with a softphone. In other embodiments, the agent may indicate the number to dial using a hard-phone (e.g., a separate physical telephone device) such that there is no keypad or function icon 514 presented to the agent. Those skilled in the art will recognized that a variety of GUI screens and associated functional approaches for facilitating a manually dialed call are possible.

Figure 5B:
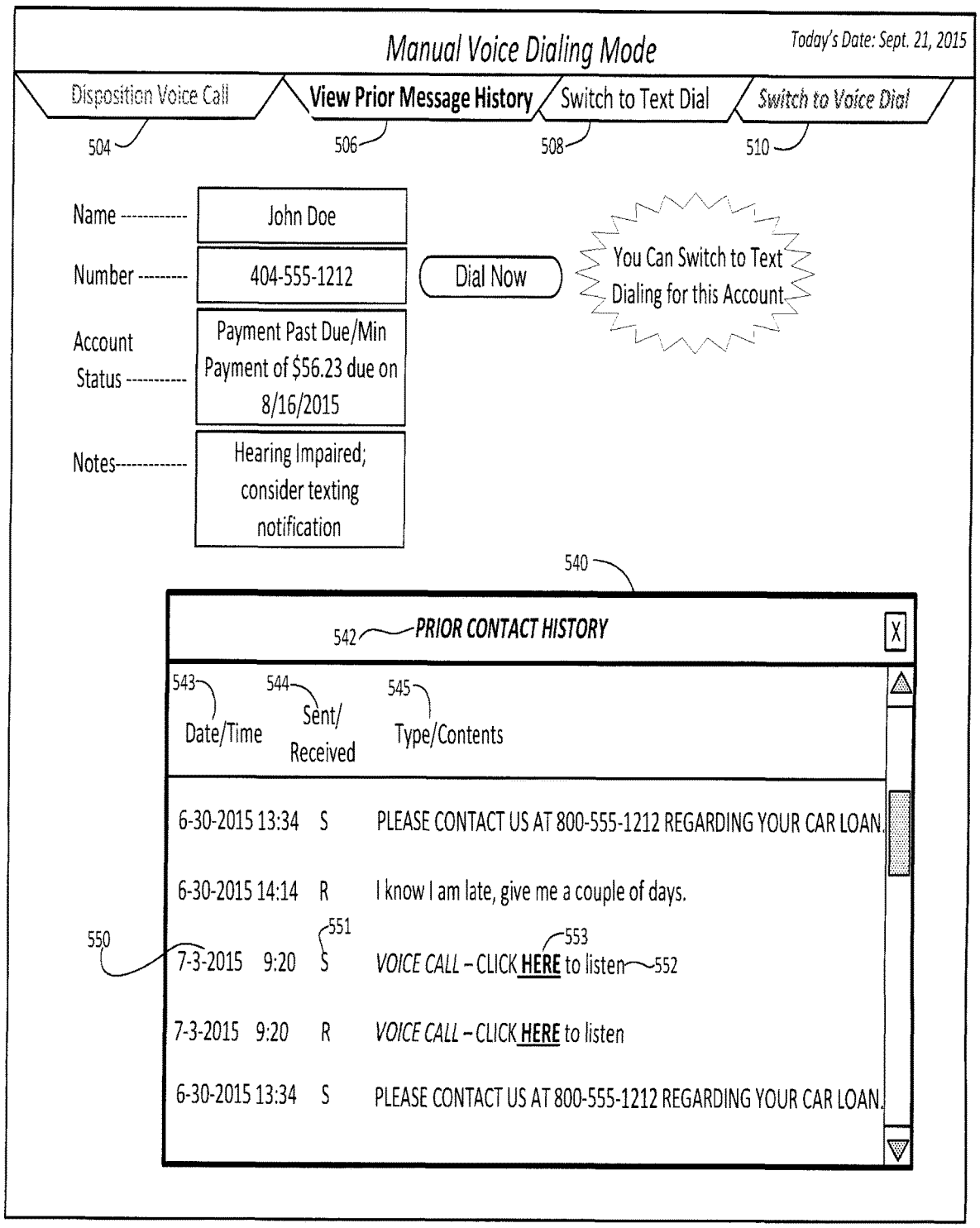

Returning to FIG. 5A, if the agent selects to view the prior message history tab 506, the agent could be presented with a pop-up screen as shown in FIG. 5B. Turning to FIG. 5B, the pop-up window 540 displays a history of prior communication with that called party. Unlike the prior art which may detail prior communication attempts in the same dialing mode as currently selected, this pop-up window presents prior communications for various dialing modes to that number or account. Specifically, information presented to the agent is not limited to communications in the same dialing mode as the currently selected dialing mode.

This embodiment of the pop-up window 540 indicates a prior contact history 542 so as to inform the agent of the purpose of the window. Further, the window includes column headers indicating the date/time 543 of the communication, whether the communication was sent or received 544, and the type and contents of the communication 545. The date/time is reflected in one format (month-day-year) and time in a 24 hour format, but other formats could be used. The send/received indication 544 reflects whether the communication originated by the contact center or was directed to the contact center. Other embodiments may indicate the dialing mode used for outbound calls. Finally, the type/contents reflects the channel used and the contents of the communication. For text calls, the contents of the text message is displayed. For voice calls, a link to hear the message is provided. Selection this link could present an audio player allowing the agent to control the playback of the audio. In other embodiments, a link to a transcript could be provided.

The purpose of the pop-window 540 is to present a summary of the prior communication with that called party, which includes information about the type of channel, when it occurred, and the contents of the communication. This allows the agent to easily review prior communications with the agent. In other embodiments, search tools may be presented to the agent to allow the agent to search for a particular word in the contents (either text or voice), a particular date or date range, or of a particular channel type. A number of functional tools can be provided to the agent to select, search, categorize, organize, and review the prior communication. Though these functional tools are not illustrated in FIG. 5B, these are among the concepts and technologies presented herein. Providing communication information regarding both voice and text communications allows the agent to have a comprehensive perspective of prior communications without having to open different windows or access different systems, which do not allow an easily chronological display of prior communications in an integrated form. Thus, the format and structure of the pop-up window 540 provides greater efficiency for the agent, faster assimilation of the information by the agent, and a more useful structuring of information.

After the agent manually dials the call, the agent may be presented with a GUI screen to disposition the call. Dispositioning the call refers to the agent (or in some instances, the dialing mode component) indicating information in the call record reflecting the outcome of the call. One embodiment of disposition codes that the agent may indicate is shown in FIG. 5C at the disposition window 560. The label 561 informs the agent of the purpose of this window, which is to indicate a disposition code. In some embodiments the agent may select a number, select a label from a pull down menu, or use some other GUI tool for indicating what happened on the call. In this example, there are indications for indicating the call encountered an answering machine/voice mail service 562, encountered a busy condition 563, or was not answered 565. In some embodiments, these conditions may be determined, and the disposition codes are populated, by the call origination equipment (i.e., dial mode component). For example, the dial mode component may detect an special information tone ("SIT") or intercept message indicating that the number is not in service, network outage, busy condition, etc.

Other disposition codes reflect what was discussed if the right party answered the phone. For example, if the agent spoke with the called party, a disposition code may be indicated reflecting that the called party indicated a promise to pay a debt 564, was unable to commit (to a payment) 566, or indicated some other reason 567. In practice, there may be greater or fewer number of disposition codes available to the agent, and the semantics are often specific to the nature of the call made. For example, a "promise to pay" code 564 is typically associated with debt collection calls, but would not be used for a telemarketing sales type call.

Although the disposition codes are shown in conjunction with use for voice calls, the agent may use these codes in conjunction with text calls. However, not all embodiments will allow an agent to indicate a disposition for a text call, since the agent may not receive a response. Some of the disposition codes do not have an analog for text calls. Specifically, the agent may have to receive multiple texts before an accurate disposition code can be entered (i.e., a completed dialogue may require several text messages to be sent). In other embodiments, the dial mode component may not provide the functionality at all for indicating the disposition code for a text call.

Returning back to FIG. 5B, the agent may decide to originate a text call instead of a voice call prior to originating the voice call. This may be motivated, e.g., by the notes information field indicating that the called party is hearing impaired, and that texting may be preferable to the called party. This information may be notated by an agent from a previous voice call, who was informed of the condition. The current agent may be motivated to originate a text call for other reasons. A text origination may take less time than a voice call, and a backlog of work may motivate the agent to originate text calls in order to catch up. Alternatively, this determination could be made by the LMM deciding that achieving a list penetration goal or work goal requires switching to text calls.

FIG. 6A-6D—Text Dialing Mode Graphical User Interfaces

For whatever reason, the agent may opt to switch the dialing mode from a manual voice dialing mode to a manual text dialing mode. To request this function, the agent could invoke the function tab 508 on FIG. 5A to switch to a text dialing mode. Note that switching to the text dialing mode must occur before the call record is voice dialed. Once voice dialed, the voice call is originated, and it cannot be originated instead as a text call. Upon doing invoking the function tab 508, the agent may be presented with a GUI as shown in FIG. 6A.

Turning to FIG. 6A, a GUI screen 600 is then presented to the agent. As intended, many of the GUI elements are similar in order to convey a similar "look and feel" to the agent. For example, an indication of the current dialing mode 602 is presented to the agent, so that the agent knows the current dialing mode. Further, the same tabs 504-506, 508, and 510 are presented to the agent. Further, the name 604, the telephone number 606, account status 610, and notes 612 are indicated for the current account. Since this is the same account that was presented to the agent in the voice dialing mode, the account information is the same as was presented in the text dialing mode.

The "copy" function icon 608 provides another alternative of a human interface for the agent to dial the telephone number. One approach for the agent to dial the number is to use the keypad icon 640, where the agent can enter each digit individually, which is displayed in a register 632. Once entering the number is completed, then the agent can select the "dial now" icon 630. This operation is, essentially, a softphone application for dialing a telephone number, except that a text call is being originated.

In lieu of the agent entering each digit of the ten digit telephone number, the agent could instead select the "copy" icon 608 which will copy the telephone number 606 into the register 632. Then the agent can select the dial now icon 630. This mode of dialing avoids agent error in entering the ten digit number and is faster and more accurate.

The contents of the text can be determined in various ways. The text of the message can be typed in by the agent or selected from a "pre-canned" message. Or, a format of a pre-canned message could be selected, which is then customized based on the called party's account information. Or, these messages could be edited by the agent to develop a customized message. Those skilled in the art will recognize that a number of different options are possible, and that FIG. 6A only illustrates a subset of the possible approaches.

The message that will be sent is shown in a message box 620. The text may be edited by the agent, using conventional editing techniques. Thus, the agent can generate an original message in the message box 620 from 'scratch' or can edit a selected or recommended text message as appropriate.

The agent may also be presented with a list of options as to the message contents. These are shown in the message selection box 622. In this embodiment, various messages related to the payment of an account are shown. The agent may select a first message 624 that is a reminder to submit a payment, and blank fields represent text (specifically in the form of numerical values) that is completed by the dialing component. Specifically, the amount of the minimum deposit and the due date is completed based on information in the called party's account. This avoids the agent from having to determine the amounts and due date.

The agent could also select a second message 626. This message is another form of a payment reminder, but it may have different wording to convey a different sense of urgency. Thus, there may be a series of message options that the agent could select, which represent different levels of urgency, depending on the account information. Finally, the agent could also select a third message 628, which is not a reminder, but an acknowledgement of receipt of a payment. Again, this option has a field which is completed by the dialer component. In various embodiments, each of the call records presented to the agent for manual text dialing could be associated with a campaign for a particular purpose, and the set of selected messages displayed in the message box 622 could be designed to correlate for various messages appropriate to that campaign. Thus, when loading a dialing list associated with a particular campaign, a corresponding set of messages would be loaded for presentation to the agent as well.

The agent may select one of the messages in message box 622 by selecting an icon, where upon that message is then used to populate the contents of the text message. Although only three messages are shown in message box 622, additional messages may be viewed by interacting with a scroll bar icon. In the example shown in FIG. 6A, the agent has selected the second message 626 which may be evidenced by a change in shading, color, or some other mechanism. Once a message is selected, that message, along with the blank fields filled-in, it is then displayed in the outgoing message box 620. Thus, the agent can see the results of exactly what will be sent to the called party. At this point, once the message is selected, the agent can dial the called party's telephone number using the keypad 640 to enter the telephone number and then select the "dial now" icon 630. The same contents may default for the next record being processed, so that the agent does not have to retype the contents each time.

The agent is also presented a message status indicator 614, which indicates whether the message is awaiting to be sent or has been sent. In other embodiments, the GUI may change upon sending the message, so that there is no confusion as to what state the call is in.

In addition, the agent is presented with an originating number indication 616. This indicates the value of the calling telephone number that is used when the text is sent out. This value is typically displayed to the called party as caller ID information by the smart phone used by the called party. If the called party so desires, a responding text or voice call can be sent to that originating telephone number. Thus, the value selected by the agent should be a value that results in routing a response text or voice call back to the contact center. In many applications, the contact center may have a variety of originating telephone numbers that can be used. For example, a contact center may use one originating telephone number for payment reminders, another telephone number for shipping notifications, another telephone number for customer surveys and feedback, another number for limited-content texting, which invites a debtor to callback the agent regarding an account, etc. Consequently, the originating telephone number used may be correlated with the particular campaign. Further, even within a campaign there may be different telephone numbers used. In the example depicted in FIG. 6A, the campaign pertains to communicating with accounts that are past due. It is possible that one originating telephone number could be used to direct responses back to Spanish speaking agents or another telephone number could be used to direct responses back to English speaking agents. In another embodiment, different originating numbers are used in outgoing texts so as to direct responses to agents addressing accounts that are merely past due versus accounts that are about to go into default. Other applications are possible where different originating numbers are used to distinguish between different agents, skill sets, groups, etc. for various purposes.

The agent can select to alter the originating number used in a text call by selecting a change value icon 618. This may result in presenting a pop-up window (not shown) presenting various options of numbers that can be used and their associated purpose. In this manner, the agent can alter a default value as appropriate. Although a ten digit telephone number (e.g., a "long number") is shown, in other embodiments the agent can select a "short code", which is a five or six digit number that can be used as well for routing a response text. Those skilled in the art of SMS texts will understand the application of short codes and how they are frequently used for high traffic volume applications.

The agent may opt to invoke a function tab, such as the "view prior contact history" tab 506. This tab when invoked, may cause a prior history contact window 650 to appear as shown in FIG. 6B. In this embodiment, the prior history contact window 650 reflects prior voice and text calls. In this embodiment, the contents are the same as was discussed in FIG. 5B. Thus, when sending a text, the agent can review the prior contact history, including both voice and text calls, and both sent to, and received from, the called party. This can be presented in a chronological order, so as to allow the agent to determine the time-ordered nature of the communications. As previously, the agent can also listen to the audio recordings of the prior voice calls and review the text of the previously sent text messages.

In other embodiments, the contact history may also include information as to which agent originated the prior communications to the called party. This may be useful to the agent upon reviewing the history, and can also be useful in routing an incoming text call to the last agent that handled a communication to that telephone number. If that last agent is unavailable, then the next last available agent could be selected. In this way, the called party is texting with the same agent, so as to maintain some sort of continuity.

Group Text Dialing Mode

The above discussion addressed the agent originating a single text to a specified account based on the call record being currently processed in the text dialing component. Another dialing mode is the group text dialing mode, which sends out a group of texts, corresponding to the group of call records in a certain dialing list. The number of call records in the group from the dialing list can vary in number and the time required to process the dialing list to send out the corresponding texts may correspondingly vary. However, the time required on a per-call basis is much less as compared to the agent manually originating texts call individually. Thus, whereas an agent may be able originate a few text calls per minute, the number of text calls originated in the group text dialing mode may be tens of thousands per minute. In other embodiments, the agent may send out smaller size groups, comprising a dozen or so records, through their shift.

The group text dialing mode allows the agent to specify a dialing list and have common treatment applied to all the calling records in the dialing list, typically without individual agent intervention for each call record. The common treatment does not necessarily result in all the text messages having the same content or originating address, however. The common treatment may involve the application of a common rule to all call records, but the rule itself then defines customization of the content and/or originating address. For example, the common treatment may involve incorporating the agent's name in each text, and allowing a customized variable of the called party's name to be included. Limited content texting, which is used to invite debtors to initiate a callback, are one example of how a rule can be used to form the contents of the group texts.

Figure 6C:
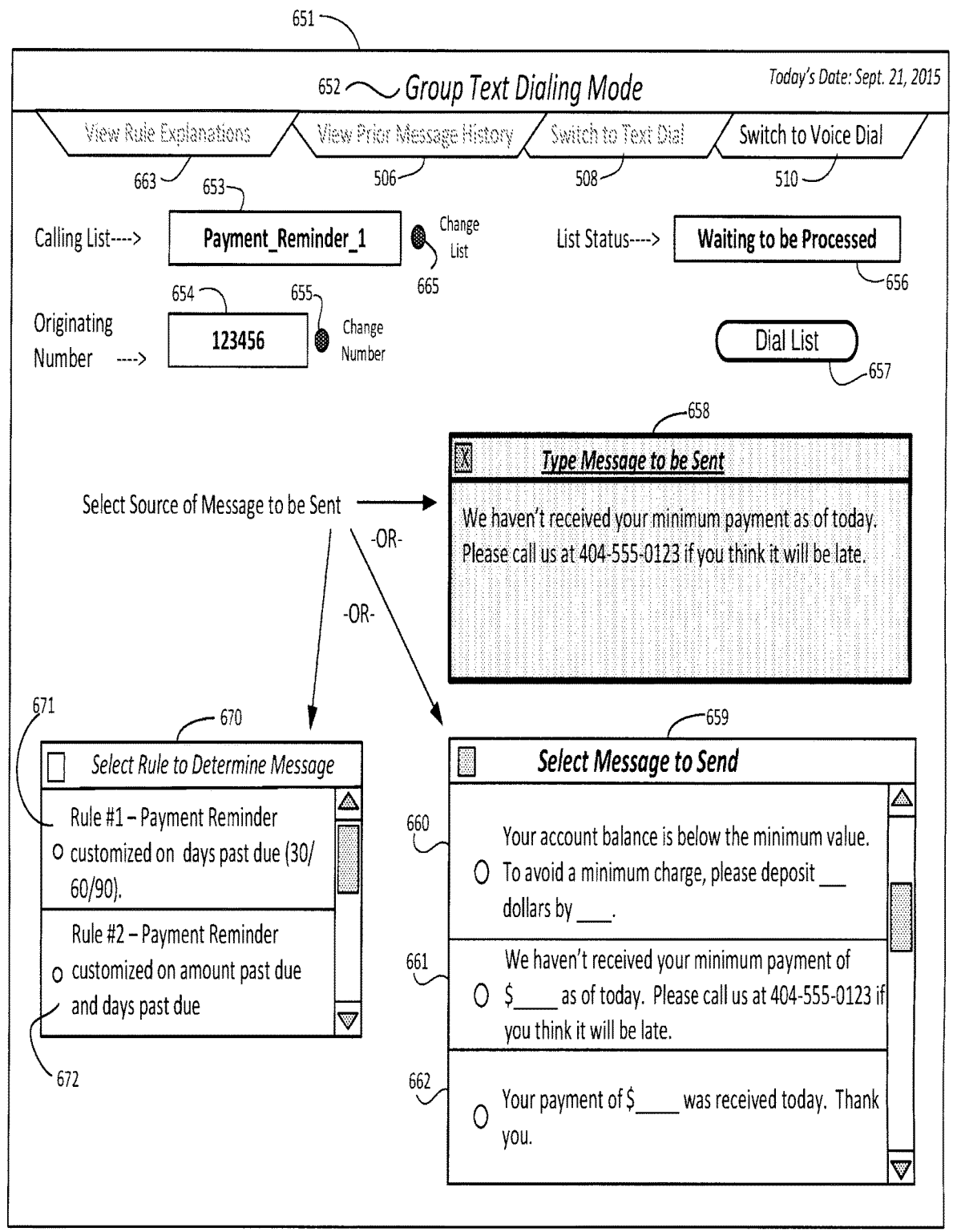
FIGS. 6C-6D illustrate embodiments of a graphical user interface for an agent in a contact center interacting with a dialing component for manual origination of a plurality of text calls.

Turning to FIG. 6C, one embodiment of a GUI screen 651 that may be presented to an agent is depicted. The screen 651 includes a text indicator 652 indicating the current dialing mode, so as to avoid any confusion on the part of the agent as to the current dialing mode. As before, a series of function tabs 663, 506, 508, and 510 may be presented to the agent. In this embodiment, function tab 663 is different relative to earlier figures and applicable only to the group texting dialing mode. Selecting this tab may present additional information to the agent regarding the application, creating, editing, or deletion of rules that define the text contents or originating address applied to the call records in the dialing list.

The agent will typically focus on selecting or verifying the dialing list 653 first. The agent can indicate a particular dialing list corresponding to a campaign. The campaign refers to a coordinated attempt to process a list of calling records according to a common purpose. In this application, the common purpose is a payment reminder for accounts past due. Other types of common purposes may be to inform called parties of a utility service interruption, marketing a particular product or service, obtaining customer feedback via a survey, seeking a charitable donation, etc. The agent can alter the dialing list using a "change list" icon 665. This will present the agent with a list of dialing list names that can be selected in lieu of the current list. In this example, the current dialing list is called "Payment_Reminder_1." This list may reflect those accounts that are considered past due and which need to be processed.

The agent may also consider the originating number 654. This is the telephone number used as the originating or calling number in the outgoing text call. Frequently, the originating number is a 10 digit telephone number, but in the text dialing mode, this may be, instead, a short code. A short code is a 5 or 6 digit number that can be used to send a text to, which is often used when high volumes of texts are involved. A "change number" icon 655 allows the agent to use a different value, as appropriate.

Next, the agent must determine what contents to include in each text that is originated using the call records in the dialing list. In this embodiment, there are three different sources that can be used to determine the contents of each text. First, the agent may define the text using the text message box 658. The agent may type in the text to generate any message desired. Or, the agent may edit an existing message that is populated in the box. This format is suitable when the same message is to be sent to every telephone number in the dialing list. The agent may be able to type in variables, which represent information to be inserted in the texts generated. For example, the agent may be able to specify insertion of the account's (i.e., called party's) name in a sentence in the text. In this manner, the agent can create a form or template for sending texts that are largely similar in content. In other embodiments, a rule for doing so may be defined, and selected by the agent. The rule can be used to present draft template language of the texts.

Alternatively, the agent may use message box 659 to determine the message contents. In this embodiment, the agent is presented with a series of customizable messages that can be generated. These may be a fixed format, where all the text is determined. In the examples shown in FIG. 6C, the draft messages 660, 661, and 662 have blank portions which are dependent on the information in the account for that call record. The blank portions could represent, e.g., the amount received, to be paid, when it is to be received, etc. Selecting one of these formats would result in each call record receiving a text with the message and appropriate values based on the called party's account information.

Finally, another way the agent may determine the message contents is to access a rules based message box 670. It is possible to use a rule to determine what message should be sent out for a particular call record. This rules based approach allows a greater degree of flexibility and customization than the customized message format discussed above. The rules based approach can select a message, based in part, on information in that particular account. Thus, the nature, tone, and wording of these different messages may be different. For example, one rule 671, called "Rule #1" is called "Payment Reminder customized on days past due (30/60/90)." This indicates that different message texts are used and the selection is based on the number of days the account is past due. Presumably, the messages have a more aggressive tone the longer the amount is past due. On the other hand, another rule 672 is called "Rule #2—Payment Reminder customized on amount past due and days past due." This selects text of a message based both on the amount past due and the number of days past due. Thus, a variety of different message formats can be applied using the rule. This would include the ability to incorporate account specific information into the message (such as the actual amount past due). The agent would be able to select a function tab 663 to review the application of the rules, view the message formats, create a new rule, etc.

In FIG. 6C, the agent has select the rule format 658, which can be edited. For example, the agent may add a "Thank you" at the end, so as to alter the tone of the message. Once the format is selected, the agent can then select the "dial list" icon 657, which will cause the list to be processed. The list status field 656 indicates the status, so as to keep the agent informed at all times of the appropriate processing status.

Figure 6D:
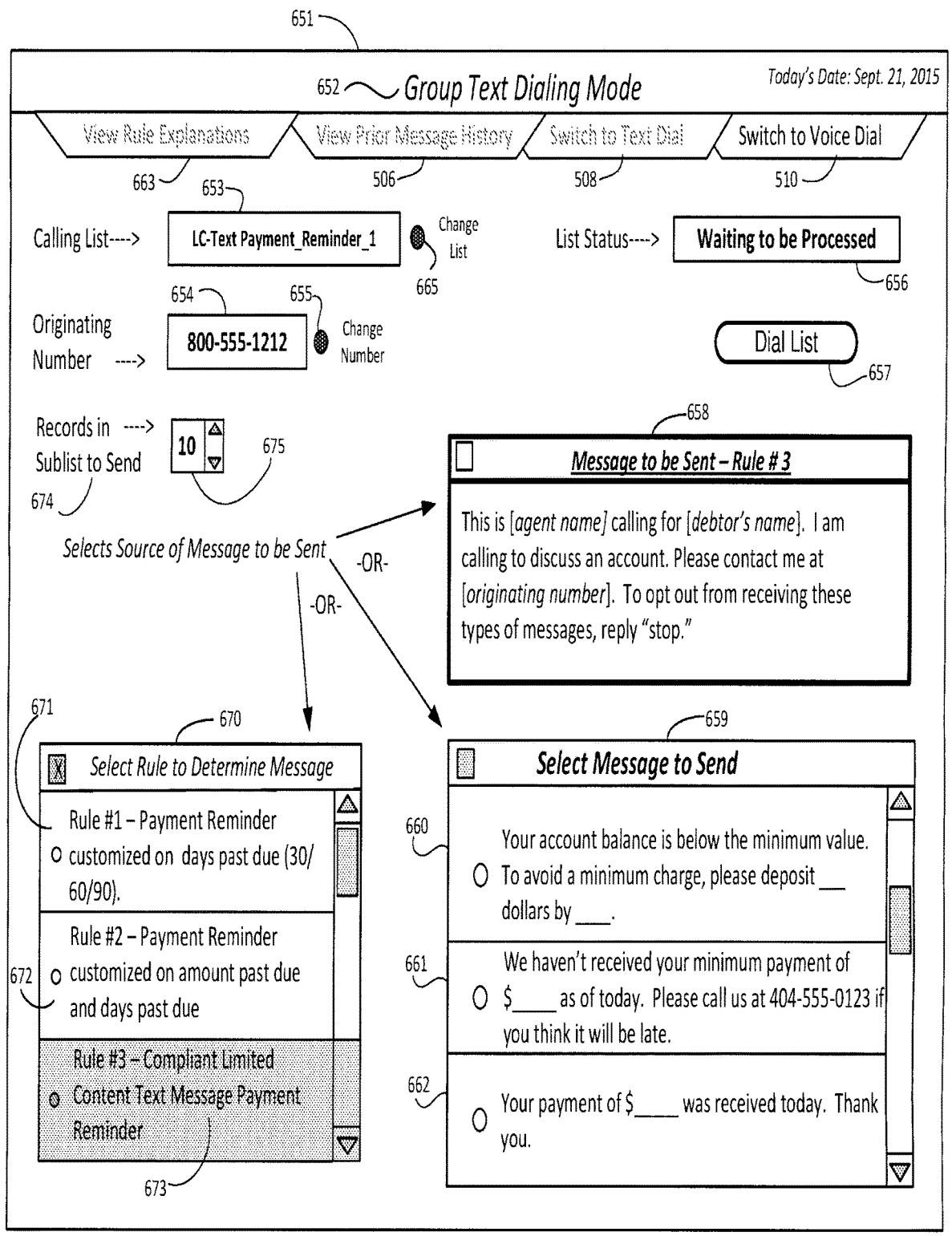

Turning to FIG. 6D, another example is illustrated involving sending a group text. In this embodiment, the agent controls sending a sub-group of texts. The same aforementioned item numbers as in FIG. 6C apply in FIG. 6D, with the provision of some modifications provided below. In this embodiment, the agent may be allocated a calling list 653, which is identified on the screen as "LC-Text Payment Reminder_!". This list may involve a large number of records, which are to be sent as texts. However, the agent may be provided with the ability to control the sending of sub-groups from this list. For example, the calling list may have, e.g., 1000 records, corresponding to texts to be sent out throughout the day. The purpose of the texts, referred to as limited-content texts, as will be seen, is to encourage debtors to call back and discuss the account with the agent sending the texts, or any other agent. Obviously, sending out 1000 texts is likely to cause a certain percentage of the recipients to call back immediately, and since the agent can only talk to one at a time, the first debtor calling back and speaking with the agent will cause the other others that call back when the agent is speaking to an account, will be placed in a queue. Thus, the agent may be provided with a tool for sending out a subset of records, periodically during their shift.

This is accomplished via the control 674 and 675. This indicates the number of records in the list—a sublist or subgroup—that are to be sent out. In this case, the number of sublist records 674 can be controlled via an icon 675. In this case, the agent has opted to send out 10 records at a time. Thus, when the agent selects the dial list icon 657, the system will send out 10 records at a time until the calling list is exhausted.

The message to be sent out is determined in this example by the agent selecting a rule from the rules based message box option 670. In this embodiment, the selection of Rule #3 673 is indicated, which may result in that option being grayed out or otherwise highlighted in some manner. In this embodiment, the description of the rule does not show the exact contents of the message, and to indicate this, the message box 658 is modified to show the contents of the limited-content text message. There may be various forms of a limited-content text message. This format may adhere, for example, to regulations promulgated by various regulatory bodies that control the communication practices of debt collectors. In this example, the message box 658 show a limited content text message that includes text in brackets that is completed when the text is generated. For example, the "[agent name]" includes text for the agent, or an alias used by the agent. The alias typically is an alias that uniquely identifies that agent. The "[debtor's name"] is the name of the account on the record (assuming the record pertains a debtor's account). The limited-content text reflects that the purpose of the text is that the agent wishes to speak to the recipient about an account, and invites the recipient to call the agent at the number indicated ("originating number"). The last sentence is an 'opt-out' indicator that informs the recipient how they can opt-out from receiving such future texts.

Thus, when the agent selects the Dial List icon 657 at various time during their shift, a group of records, the number of which is identified in box 675 are sent. Thus, the agent can control throughout their shift, when and how many limited-content texts to send out. Each text will be customized by reflecting the agent's name, the indicated number, and the debtor's name. The originating number may be unique to the agent, or it may be a main number, where the caller can then indicate the agent they are calling back to speak with. The agent may be present the dial list icon 657 on other screens, such that the agent can easily cause the sublist of records to be sent, such as when the agent is not presently handling other calls. Thus, an agent that is particularly busy with other activities, such as handling other outbound calls or handling other inbound calls, may withhold selecting the dial list icon 657 until such time that the agent is able to process such calls. The Dial List icon 657 may appear or may be replicated on a screen used by the agent for handling inbound calls. Thus, rather than navigating to the "Group Text Dialing Mode" screen as shown in FIG. 6D, the agent could configure the screen and then navigate to some other screen, such as handling inbound or outbound calls. The agent could be processing, e.g., the callback calls resulting from sending the limited-content texts, and when the number of inbound calls diminishes, the agent could invoke the dial list icon 657 to originate another batch of records, which would cause more callbacks to occur.

Text Call Compliance Processing Based on Calling Windows

Whenever a text call is originated, whether in a manual individual text dialing mode or a group text dialing mode, certain compliance checks may be performed. Such checks have not been performed in conventional texting systems, since texts are conventionally not considered as a "call." However, performing the compliance check in the dialing component facilitates compliance processing in various situations. Doing so also avoids having to integrate and harmonize data from incompatible dialing components after the calls have been made.

Turing to FIG. 7, one embodiment of a process flow is shown for originating a manually dialed individual text call with compliance processing based on ensuring the text is sent within an allowable calling window. Specifically, checks are made to ensure that the text is not being sent outside of an allowable calling window. The calling window is presumed to be between 8:00 a.m. and 9:00 p.m. local time of the called party. Thus, it is necessary to know the time zone of the called party.

The process begins with retrieving (or receiving) the next call record in operation 702. It is presumed for this flow, that the dialing mode is a manual individual text dialing mode, as reflected in operation 704. The call record is then provided to the manual individual text dialing component in operation 706.

The dialing component will ascertain the called telephone number and optionally the residential address of the called party in operation 710. In some embodiments, as will be seen, only the called telephone number will be used to ascertain the allowable calling window. Next, the rule used to ascertain the time zone or location of the called party is determined in operation 712. In this embodiment, there are four potential different rules that could be used. The rule could be the same for each call record in the dialing list, or could be unique to each call record in the dialing list. Other embodiments may utilize additional rules.

The first possible rule is reflected in operation 714. This rule uses only the NPA-NXX portion of the called number. For example, if the called number is 404-847-1212, the NPA-NXX portion is 404-847. The 404 area code is located in Atlanta, Ga., and the 847 central office code is geographically limited to north central Atlanta. Thus, the called party is presumed to be in the eastern time zone. Knowing this, the dialing component can determine whether a text originated is within the calling window. For example if the dialing component is located in the eastern time zone, then the current time of the dialing component is the same as the current time for the called party. If the dialing component is in the pacific time zone, then the dialing component is three hours behind the time for the called party (in the eastern time zone). The use of the NPA-NXX may not be accurate, since the number may be a wireless number, and the called party may not be presently located in that geographical area, and time zone, of the NPA-NXX of their wireless number.

Hence, another rule that may be used is to use the residential address of the called party, as reflected in operation 718. The address information must be known in this case, and for many accounts, some sort of address information of the called party may be retained. This may be required for billing or identification purposes. The zip code is frequently used to ascertain the location and hence the time zone of the called party. Once known, this can be used by the dialing component to determine if the text can be sent. If for some reason it is unknown, then another method can be used, such as the rule above.

Another rule that can be used is to use both the residential address and the telephone number as reflected in operation 716. This effectively takes the more restrictive result of the location/time zone determination. For example, the address may be associated with the eastern time zone as is the NPA-NXX. If so, then it is safe to presume that the called party is in the eastern time zone, and hence the calling window can be determined based on that location. On the other hand, if the address is located with one time zone, and the value determined using the number is located in a different time zone, then the more restrictive value is used. For example, if the two time zones are pacific and eastern, then if the dialer component is located in the eastern time tone, it will presume that the opening calling window is predicated on the called party being in the pacific time zone. Then, for the closing calling window, it will presume that the called party is in the eastern time zone.

Finally, another rule, which is rather simple, is to simply use a "safe window", which is from 11:00 a.m. to 9 p.m. eastern time for calls in the continental U.S. Regardless of where the called party is located in the continental U.S., this will be a safe calling window. For example, if the called party is in the pacific time zone, then at 11:00 a.m. in the eastern time zone, this would be 8:00 a.m. in the pacific time zone. Thus, a dialing component located in the eastern time zone could safely originate a text no sooner than 11:00 a.m. without the risk of sending it too early. Similarly, if all texts are sent by the dialing component by 9:00 p.m. (eastern), then this would be safe as well regardless of where the called party is located in the continental U.S. If the called party is located outside of the continental U.S., then the safe windows need to be adjusted by being narrowed. Note that ceasing any calls by 9:00 p.m. (eastern) will mean that no calls later than 6:00 p.m. will occur for the pacific time zone. Thus, while it may be a "safe" window to use, it may not utilize the maximum hours allowable.

Once the appropriate rule is selected and used, a determination is made in operation 722 whether the text can be sent out without violating the calling window. If the text can be sent out, then the system waits for the agent to actually cause the text to be sent in operation 724. Once the agent authorizes that text to be sent, it may be rechecked again (since the agent may have waited some time before authorizing it to be sent), the text call is sent and the call record is update appropriately in operation 728. If the text cannot be sent in operation 722, then the agent is informed that the text cannot be presently sent out. The agent may request that the message be queued for later sending in operation 730. If so, the text is associated with an outbound queue for later sending in operation 732. The process then continues at processing point "A" in FIG. 7B. If queuing is not desired, then the call record is skipped in operation 734, and the call record is updated to reflect that a call origination was not made, and the reason why.

Figure 7A:
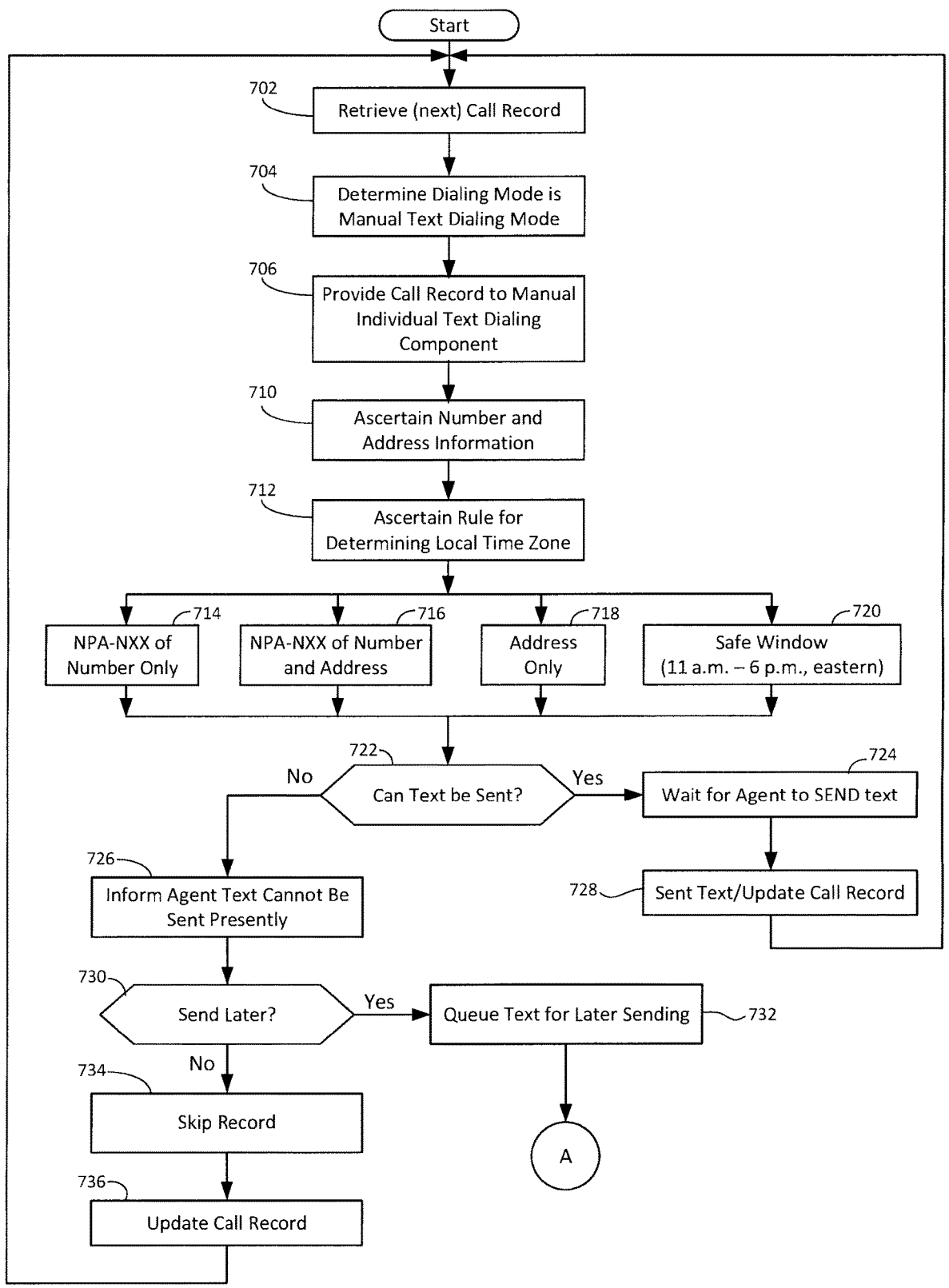
FIGS. 7A-7B illustrate an embodiment of a process flow for processing a call record to manually originate a text call in a manner compliant with allowable calling window regulations.

There are a number of variations on the process flow shown in FIG. 7A that are possible, and are within the scope of the inventive concept. First of all, the dialing list could be scrubbed so that only the remaining records are safe to be sent within the current hour. A series of lists could be generated, each safe to be sent during a specific hour. Second, the testing for a safe window could be greatly simplified by simply sending out the texts between the hours of 11:00 a.m.-9 p.m. (eastern) assuming the called parties are within the continental U.S. This approach may be suitable for group text dialing modes, because the time required to send the texts is relatively little. In many embodiments, the entire list of call records may be processed and the texts sent out within an hour's window. If the list is scheduled for manual dialing by agents within 11:00 a.m. an 6:00 p.m. eastern, then in essence the dialing equipment does not have to ascertain and apply the rule to ensure compliance with the calling window. The group dialing list could simply be scheduled for, e.g., 1:00 p.m. eastern. It is also possible to apply different rules for determining the calling window depending on whether call records are in the group text dialing mode or a manual individual text dialing mode.

In addition, the rule processing may occur in the LMM or the dialing component. Call records that cannot be sent within the current window could be simply skipped and not even presented to the agent, nor is the agent ever informed. A number of variations on the basic processing are possible. However these variations are defined, the generating of the text should be sent to the called party within the specified calling window.

Figure 7B:
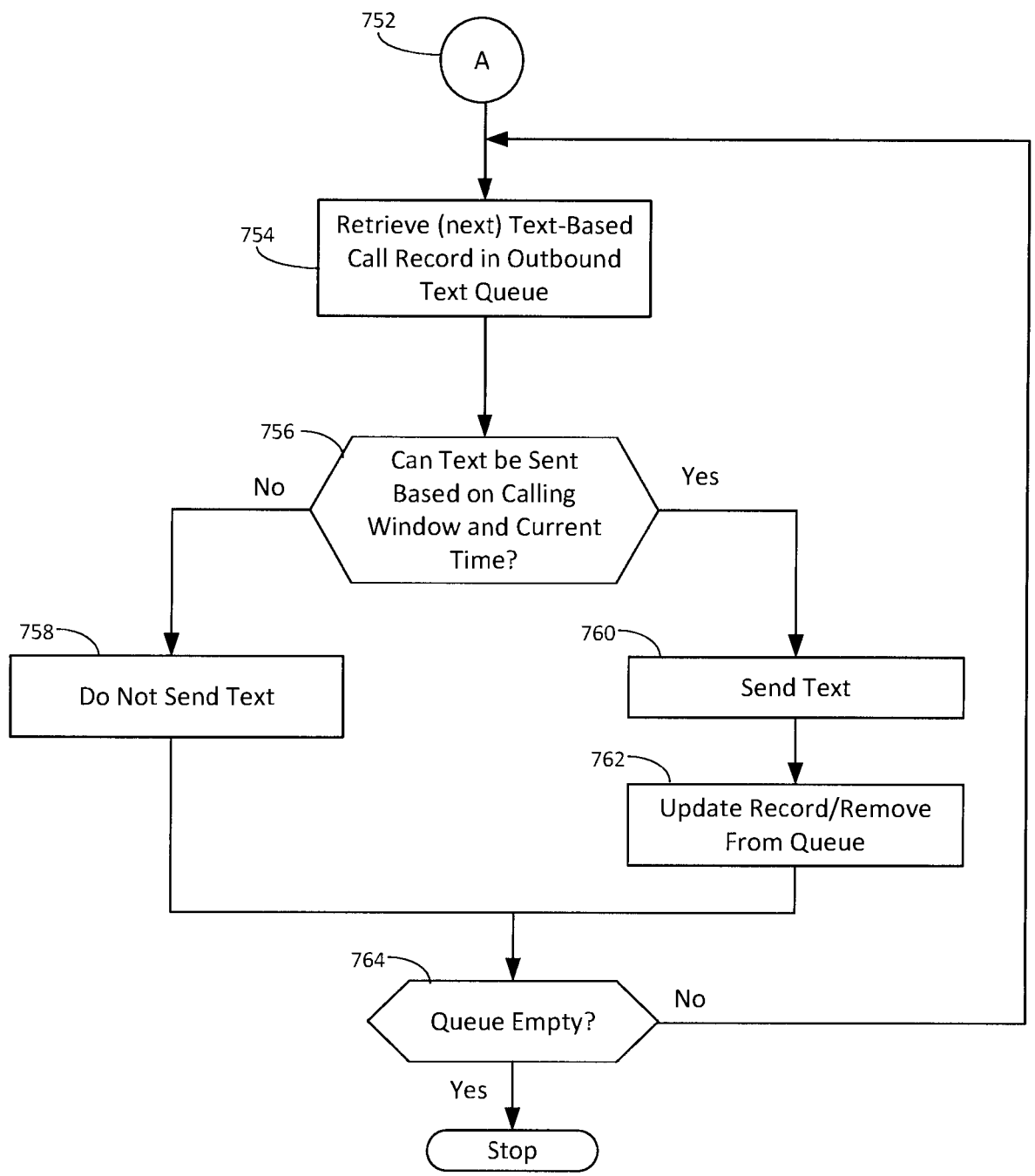

As noted above, a text call which cannot be originated at the current time is sent to a queue for subsequent processing in operation 732. This process flow then continues to point "A" 752 in FIG. 7B. Turning to FIG. 7B, the process continues by retrieving that record in the outbound text queue at a subsequent point in time. A test occurs in operation 756 to determine if the text can be sent based on the calling window for that called party and in light of the current time. If the text can now be sent, then it is sent in operation 760. The call record is then updated and removed from the outbound queue in operation 762.

If the text cannot be sent in operation 756, then the process will not send the record, as illustrated in operation 758. The process will then continue to test whether the queue is empty. If not, then the process returns to operation 754 to process any remaining records in the queues. If there are no more records, then the process completes.

Essentially, the records are placed in the queue, and each hour a test is made to see if the calling window has opened for that particular records, and if so, then that record can be sent and removed from the queue. If the calling window is not open, then the record remains in the queue, and other records are processed. Note that if a record cannot be sent in operation 756, then it will not be sent as indicated in operation 758, and the result of the test in operation 764 will always be that the queue is not empty. A record that cannot be sent may remain in the queue for a number of hours, but usually the calling window will open up again no later than 17 hours later (e.g., sometime the following day). A flag can be set to indicate whether the text should be sent during the current day, or if not, then whether it can be sent the following day. The process of checking the outbound queue shown in FIG. 7B runs in parallel to the process shown in FIG. 7A. Thus, placing records into the outbound queue, while waiting for the calling window to open up, does not prevent other records in the dialing list from being processed. Further, as noted earlier, the agent may also be handling inbound calls, i.e., a blended environment may exist where the agent is originating outbound calls, such as text calls, while receiving inbound calls. This may happen if the text calls are inviting the called party to originate a voice callback. It is quite possible that an agent processing the dialing list will result in a number of text calls being attempted, but which cannot originate, and are placed in the outbound queue for later origination. This does not prevent the agent from originating other text calls from the dialing list which do fall within the calling window.

One embodiment of the processing of the call records placed in the outbound text queue is shown in FIG. 7B. Turning to FIG. 7B, the process begins by examining the record (or next record) in the text-based outbound text queue in operation 754. That text call record is then tested in operation 756 to determine whether the text call can be originated to the intended target individual based on the calling window and the current time. As noted before, the allowable calling window for the intended recipient can be determined in a number of ways, any of which could be applied in conjunction with the test of operation 756.

If the text call cannot be originated, then the process proceeds to operation 758, where the text call is not originated. If the text call can be originated, then the process flows continues to operation 760, where the text call is sent. This may result in sending a message to an SMS text gateways, which then forwards the call to a mobile carrier, which in turn sends the corresponding wireless text to the target individual's mobile phone. Then, that call record is updated to reflect that it was sent, including the time of sending, and that call record is then removed from the outbound text queue in operation 762. The process then continues to test whether the outbound text queue is empty in operation 764. If the queue is empty, then the process stops. If the queue is not empty, then the operation proceeds to operation 752 where the next call record is examined.

Although this process is shown as a continuously and immediately looping process that processes each record in the outbound text queue, in practice the process may be scheduled to process the outbound text queue periodically. For example, if the entire outbound text queue can be processed in five minutes, then the process may be scheduled to occur periodically (e.g., every ten, twenty or thirty minutes, or once an hour) so as to save processing efficiency. That is because a call record will either be within or outside the call window during the current hour, and there are no gains for repeating the process during the current hour if it cannot be sent. However, once the current time shows that the current hour changes, then a call record may then fall within the calling window, and processing of the list again is then appropriate.

Text Call Compliance Processing Based on Call Attempts

The dialing component processing the text call must not only ensure that the originating text call complies with calling windows, but also complies with a maximum allowed number of call attempts within a certain time period. In many cases, the time period may be set as a maximum number of attempts per day or week. For example, some states may only allow two attempts (both voice and/or text, combined) to be sent to a debtor during a seven day period. Other regulations may limited seven voice call attempts to a debtor within a seven day period. Other time periods may be defined for each account or on a campaign basis. In the example that follows, a maximum attempt threshold is defined that is used to determine whether the current text being considered for origination meets or exceeds a maximum attempt threshold. The setting of this threshold value may occur in various ways. For example, the threshold may be determined by a federal regulation, a business policy, or a state statute. The process for determining whether a proposed communication exceeds a threshold is not dependent on how that threshold value was determined. In some embodiments, the threshold is a value entered based on a regulator requirement, and the threshold may encompass the combined number of voice and text calls, or just voice or text.

Figure 8:
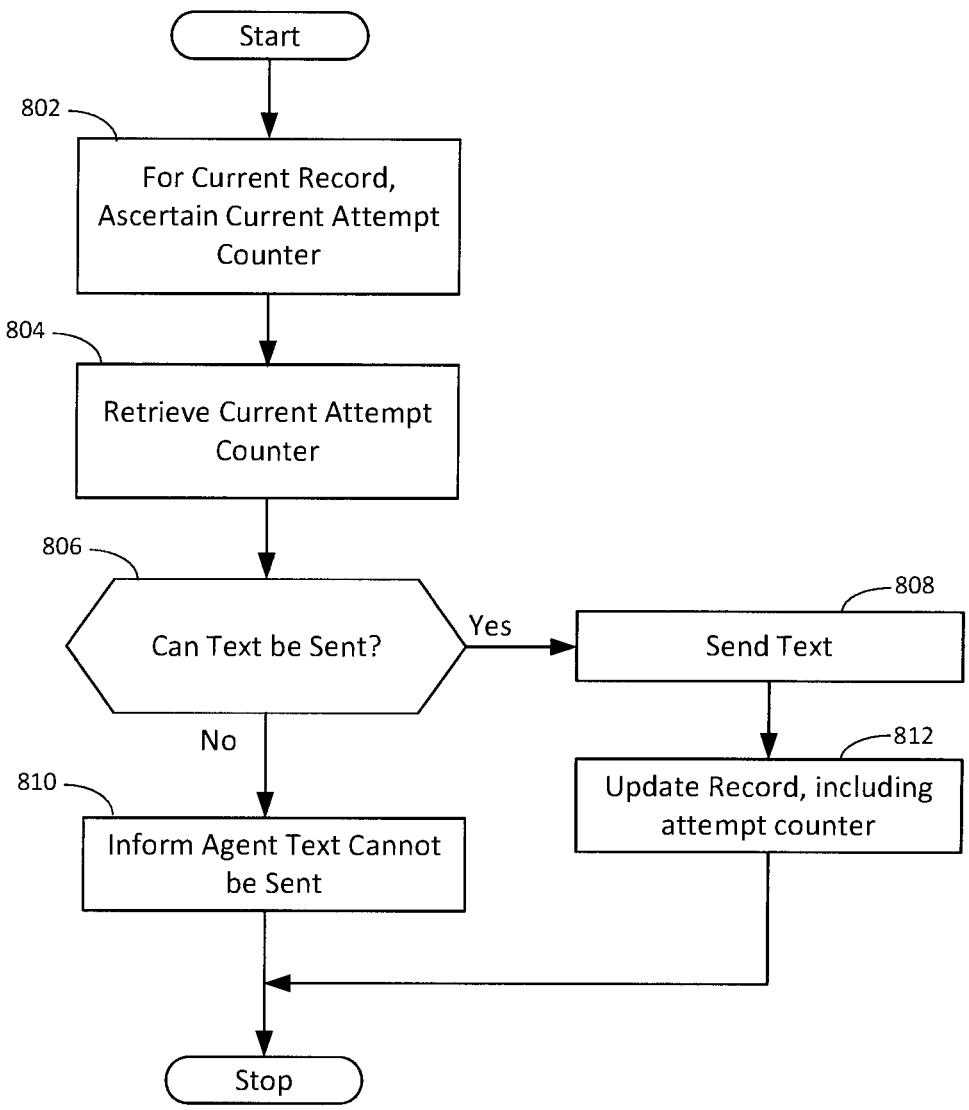
FIG. 8 illustrates an embodiment of a process flow for processing a call record to manually originate a text call in a manner complaint with allowable call attempt limits.

A process flow illustrating one embodiment of how to test whether a text call can be tested for compliance with call attempt limits is shown in FIG. 8. Turning to FIG. 8, the process begins with retrieving, receiving, or otherwise processing the next text-based call record in the outbound text queue in operation 802. Next, a current call attempt counter value is retrieved in operation 804. This value reflects the number of prior communication attempts made to that telephone number in a prior time period. This value may be stored with the call record, or may be retrieved from another database based on the destination address that the call is being directed to. However that value is stored, it is used to determine whether the current attempt can be made to that number in operation 806. That test involves determining whether the number of prior attempts exceeds the maximum attempt threshold. If the text can be sent, then the text is sent in operation 808, and the call record is updated in operation 812 reflecting it was sent, and the attempt counter is also updated, reflecting that another attempt was made. If the text call cannot be made in operation 806, then the process continues to operation 810. In this embodiment, the agent is informed that the text call cannot be made because doing so would exceed the communication attempt counter threshold. The process then stops.

This embodiment informs the agent that the text cannot be sent, which may be appropriate in manual individual text dialing calls. In the case of group texting, where a list or sub-list of call records are processed, the agent may not be informed individually for each call that could not be originated. In this case, an exception report may be generated instead.

Modification of the Dialing Mode

In some circumstances, it is possible to alter the dialing mode selected for a call record. In the embodiment described below, altering the dialing mode for a call record is described in the context of an agent beginning to dial an individual call record in a manual manner, and switching from a voice dial mode to a text dial mode. The modification of the dialing mode may be triggered in various ways. The dialing mode may be changed automatically based on application of a rule or manually by an agent requesting modification of the dialing mode. As it will be seen, a call record may be prohibited from having its initially selected dialing mode modified. This may be defined on a record-by-record basis, on an agent basis, or campaign basis (e.g., all the call records in the dialing list cannot be modified).

Figure 9:
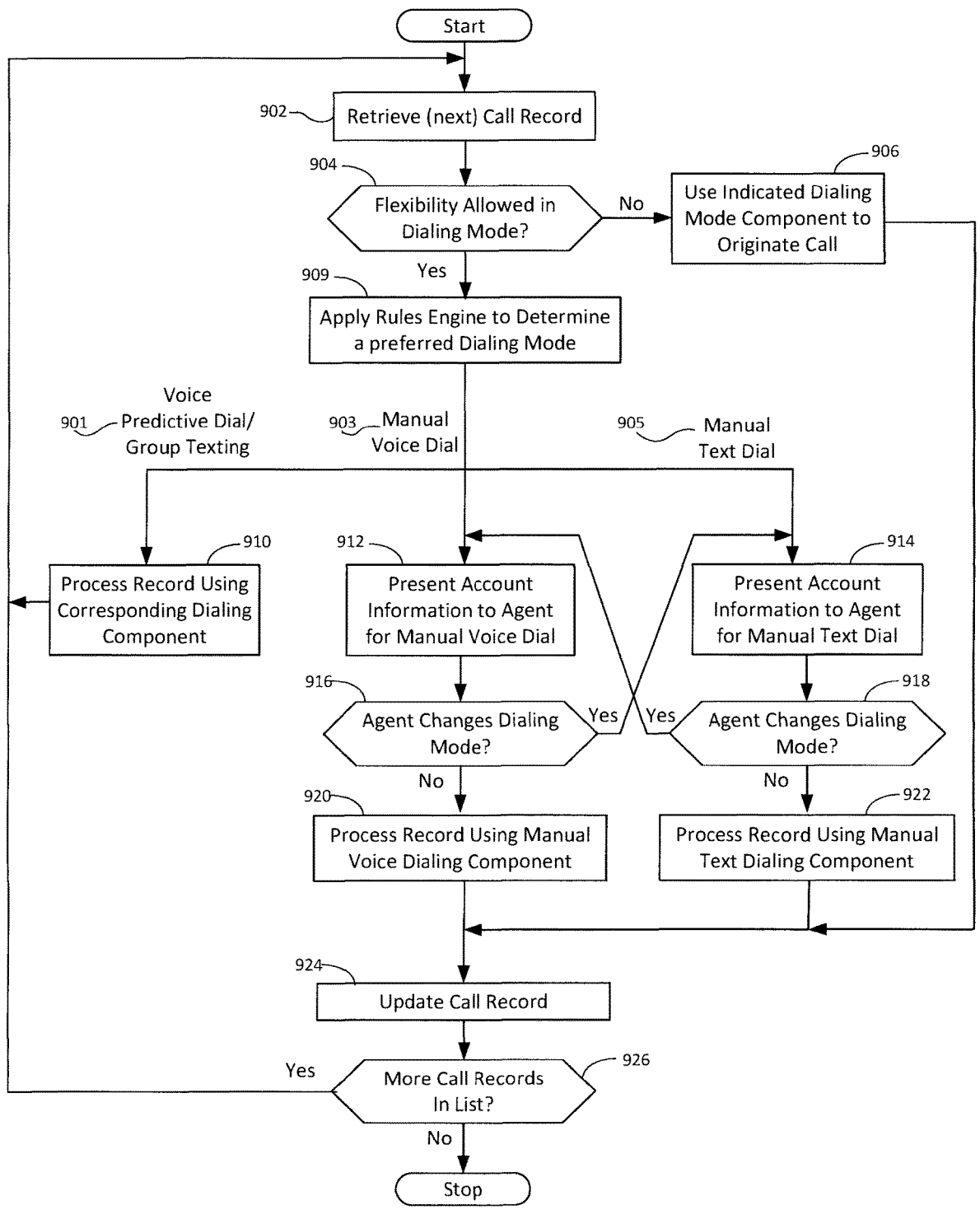
FIG. 9 illustrates an embodiment of a process flow for processing a call record in one of several dialing modes.

One embodiment of the process illustrating a modification of the dialing mode is shown in FIG. 9. Turning to FIG. 9, the process begins with retrieving (or receiving) the next call record from the dialing list. Each call record may have an indication of whether the dialing mode can be modified or not. This information may be implicitly or explicitly indicated. For example, a dialing list may be defined as unmodifiable. Hence, each call record is implicitly associated as not being capable of being modified. The information may also be indicated in a flag in the call record or in an associated account information database, which indicates whether the dialing mode can be modified. In another embodiment, a rule may be applied to each record to determine whether the dialing mode implicitly or explicitly indicated can be modified.

If it is determined in operation 904 that the dialing mode is inflexible, i.e., that it cannot be modified, then the process continues to then use the indicated dialing mode component to originate the call in the indicated dialing mode in operation 906. The process continues to then update the result in the call record, as appropriate, in operation 924. If there are more call records, then the process returns to operation 902. If not, then the process stops.

Returning back to the test to determine whether the dialing mode can be modified in operation 904, if there is flexibility allowed, then an optional step may occur to apply a rule by a rules engine to determine a preferred dialing mode. This step may alter the default dialing mode, or this step may define whether a change to the default dialing mode is to occur. In the latter case, the outcome of this step may be the basis to inform the agent as to whether a change is preferable.

The outcome is that by this point in the process flow, an initial dialing mode is determined, which may be a voice predictive dialing/group texting mode 901, a manual voice dialing mode at point 903, or a manual text dialing mode at point 905. If the call record is part of a group, i.e., it is to be voice dialed along with other voice call records or it is to be originated as part of a group texting operation, then the call record is processed using the corresponding dialing component in operation 910. Specifically, in this process flow, call records that are in a dialing list which are predictively dialed or group texted are processed in that manner without further modification of the dialing mode. In other embodiments, it may be possible to alter the dialing more.

Assuming that the call record is not predictively dialed or group texted, then that means the call record is individually manually voice dialed at point 903 or manually text dialed by the agent at point 905. The process flow in either case is somewhat similar. Assuming that the call record is voice dialed, then the account information associated with that call record is presented for display to the agent for voice dialing in operation 912. The account information may be limited to information contained in the call record, or the call record information may be used to retrieve additional information from another database. The information is presented to the agent, who may view and study the account information for a moment. The agent may then opt to change the dialing mode in operation 916. The basis for the agent doing this may vary, as will be seen. In one embodiment, output from the application of the rules engine in operation 909 may be displayed to the agent, as a recommendation or suggestion as to whether a dialing mode modification is appropriate.

If the agent does not alter the dialing mode in operation 912, then the call record is processed using the manual voice dialing mode component in operation 920. The call record is then updated in operation 924. If the agent does alter the dialing mode operation 916, the process continues to present account information to the agent for a manual text dialing mode in operation 914. The information presented to an agent in the manual text dialing mode may be slightly different from that presented to the agent in the voice dialing mode. If so, the process continues to operation 918, where the agent is allowed to alter the dialing mode back to voice dialing, if so desired. If the dialing mode is not changed, then the call record is then processed using the manual text dialing components in operation 922. The process then updates the call record in operation 924 to reflect the dialing mode used, as well as other pertinent information.

If the dialing mode determined at operation 909 is a manual text dialing mode at point 905, then the process continues to operation 914 where the account information is presented to the agent for originating the call using a text dialing mode. The screen controls may be similar, but they are slightly different from the voice dialing mode, as evident in the discussion involving FIGS. 6a-6c. The process continues in operation 926 as long as there are records for the agent to manual dial.

The reasons why an agent may opt to alter the dialing mode from voice to text, or vice versa, may vary. The agent may know that the targeted individual is more apt to respond to a text message than a voice call. The nature of the communication may be better suited for a text or voice call. For example, a simple reminder may be suited as a text call, whereas an explanation of a problem may be better suited as a voice call. In other embodiments, the agent may have a sore throat, and may prefer to originate text calls. In other embodiments, the agent or contact center may have goals defined, as to the number of calls to originate, and the text dialing mode may be faster and just as effective and may increase the likelihood of meeting a productivity goal. There are various reasons in addition to these as to why an agent may alter the dialing mode. The process flow in FIG. 9 shows one embodiment, and no doubt those skilled in the art after reviewing this disclosure may ascertain other variations.

Application of Rules to Determine the Dialing Mode

Figure 10:
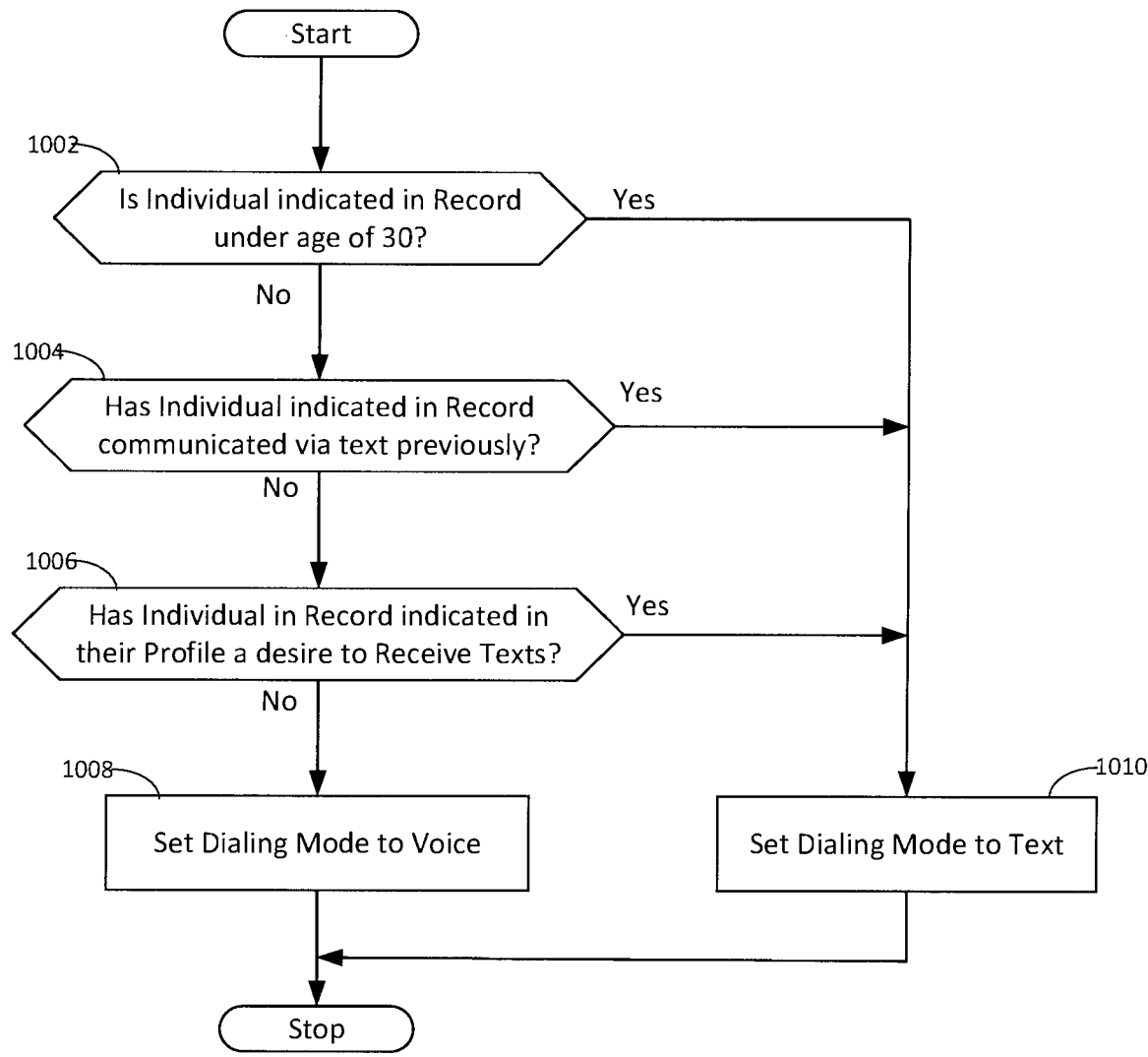
FIG. 10 illustrates an embodiment of a process flow of a rule for selecting a dialing mode for a call record.

One embodiment of an automated rule applied by a rules engine in operation 909 of FIG. 9 is illustrated in the process flow shown in FIG. 10. It should be recognized that a variety of rules can be used. Some rules engines may apply a deterministic set of rules based on account data only, whereas other rules may apply statistical modeling techniques based on other accounts in the dialing list.

For example, the process flow in FIG. 10 could be used to determine an initial dialing mode, or could be used to inform an agent as to a preferred dialing mode, if it is different from the initial dialing mode. In some embodiments, for example, a dialing list could be defaulted to a particular dialing mode so that all records default to voice dialing mode, but each call record is analyzed by a rules engine, so that when the account information is presented to the agent in the voice dialing mode, additional information provided to the agent indicates as to whether they can, and should, modify the dialing mode.

Turning to FIG. 10, the process may examine information associated with a call record by accessing information associated with the account, such as testing whether the individual receiving the call is under the age of 30 in operation 1002. The logic behind this determination may be that individuals of a younger age (e.g., less than 30) may be more responsive to receiving text calls as opposed to voice calls. If so, then the dialing mode is set to a text dialing mode in operation 1010.

If the individual is not under the age of 30, then the next determination is whether the individual has used text to communicate previously in operation 1004. The individual may regularly use text, and this may be a basis to use the text dialing mode. If so, then the dialing mode is set to the text dialing mode in operation 1010.

If the individual has not used text previously, then the process continues to operation 1006 where a determination is made if the individual indicated a preference to use text. The individual may be a new customer, and hence does not have a history of communicating via text in operation 1004. However, if the individual has indicated a preference to use text, then the process continues to operation 1010 where the dialing mode is set to text.

If none of the conditions in operation 1002, 1004, and 1006 indicate the dialing mode is to be set to text, then the process flow continues to operation 1008 where the dialing mode is set to voice. This algorithm is a relatively straightforward application of a set of deterministic rules to illustrate whether to determine the call record should be originated (or recommended as being originated) as a voice call or text call. No doubt, those skilled in the art in light of this disclosure can identify other embodiments as to how the dialing mode can be selected or determined. Many variations are possible as to the test to determine how the dialing mode is determined.

Application of Rules to Determine the Text Call Contents and Originating Number

A rules engine may also determine the contents of the text message and/or the originating number used, prior to the agent directing the text message being sent. The rules engine functions as an algorithmic-based assistant to the agent to define, recommend, or present the text message contents and/or the originating telephone number (or short code, as may be the case).

The text message contents may be presented to the agent as the contents that must be used, or may be presented to the agent for further editing and customization. The presentation of the text contents reduces the time that is required by the agent to manually type the message, and further, application of various rules may allow presentation of the most applicable message for that called party. It is unreasonable to expect for the agent to be able to know all the salient facts for a particular account and be able to draft a message optimized for that situation in a timely manner.

Figure 11:
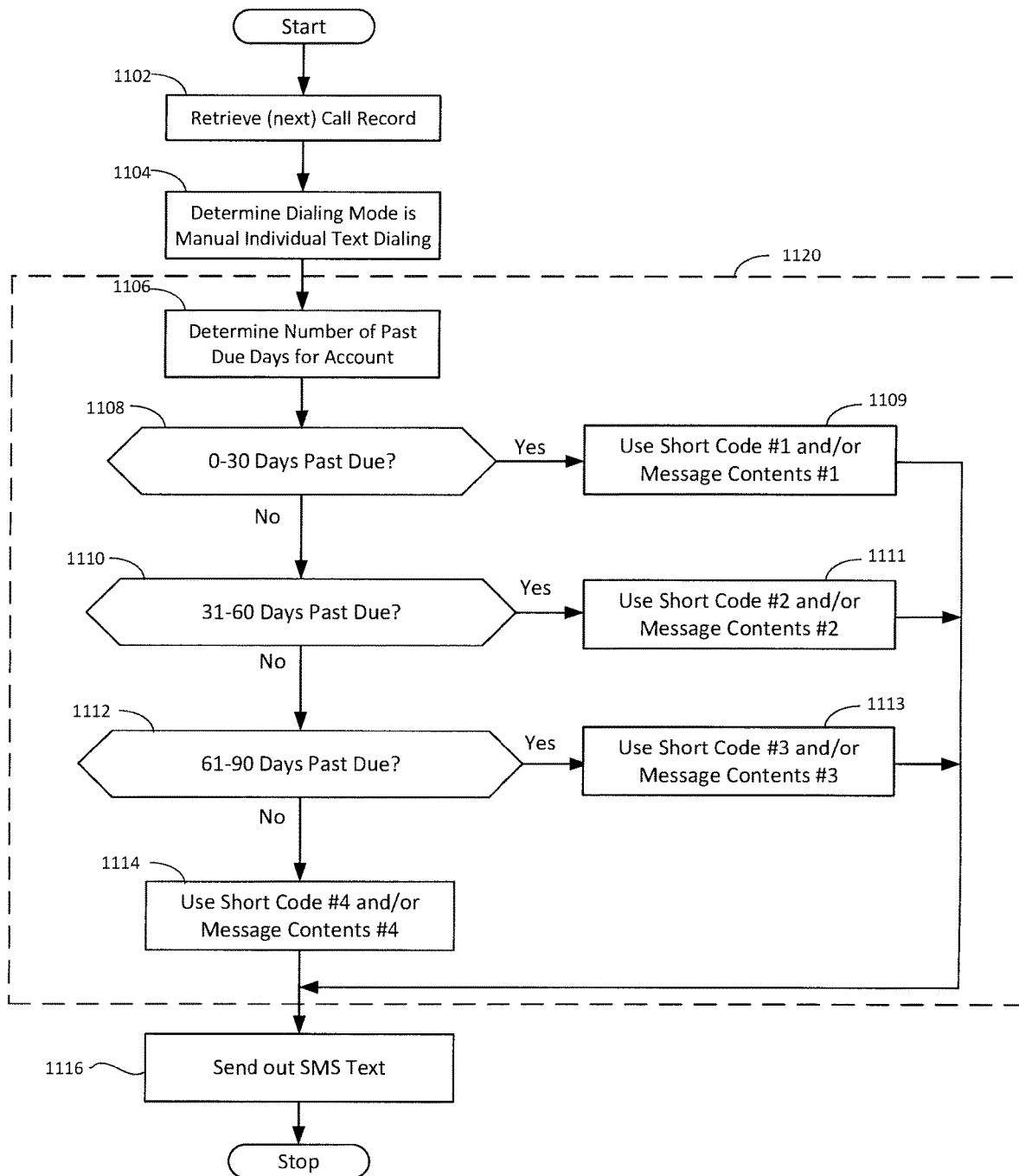
FIG. 11 illustrates an embodiment of a process flow for processing a call record in a text dialing mode using a rule for determining the text contents of the text call and/or short code used.

One embodiment of a process flow that can determine the message contents and/or the originating telephone number based on application of rules is shown in FIG. 11. Turning to FIG. 11, the process begins by retrieving a call record in operation 1102. Because the subsequent process flow 1120 is applicable for the manual individual text dialing mode, this determination is made in operation 1104. In this embodiment, the call list pertains to sending a reminder to a called party about an amount that is past due. The message contents depends, in part, on the number of days past due, so this information is determined in operation 1106. In other embodiments, the message contents and/or originating number may also depend on the amount past due, the number of times the debtor has been late, their credit score, etc. This example is based on a single variable so as to illustrate the principles of how a rule could determine the message contents and/or originating number.

If the past due amount is 0-30 days later, then a particular short code (short code #1) is used. Similarly, a particular message (message contents #1), is used as shown in operation 1109. This could be, for example, a "gentle reminder" of payment. The use of a particular short code could be used to handle inquiries from individuals responding with a question or response. A short code is simply a code that text messages are routed to, and allows service providers to route large volumes of text messages to a destination.

If the amount is not 0-30 days past due in operation 1108, then the next test is to determine if the amount past due is in the 31-60 day range. If so, then a second message contents and/or short code is used in operation 1111. Otherwise, if the amount is over 60 days, then a test occurs to see if the past due is in the 61-90 day range. If so, then a third message contents and/or short code is selected in operation 1113. Finally, if the message is past 90 days, then a fourth message content and/or short code is used in operation 1114. Once the application of the rules is completed, the agent may then cause the message to be sent in operation 1116. Not shown is the optional ability of the agent to further edit and/or customize the text contents using the GUI before originating the text call.

It is evident that the application of rules can be used to select different messages for slightly different situations. For example, a customer initially late on sending a payment may receive a "mild" reminder text while those having been previously reminded a number of time may receive a more "stern" reminder. This allows greater flexibility and customization in the text message contents, and reduces the time required by the agent to analyze the account information.

The definition of the rules 1120 may be based on information in the call record, related account information, or information retrieved from external sources. The definition of the applicable rules will vary for each application, and those skilled in the art will recognize that a vast number of such rules could be defined to handle various situations for debt collection calls, appointment reminders, customer service applications, utility outage notifications, school emergency notifications, etc. The rule definition 1120 may employ various predictive modeling techniques for determining which category a called party falls within, and which message should be included in the text call.

The determination of the calling telephone number used in the outgoing text message may also be selected by the system, so as to optimize the selection of agents handling any response. Returning to the above example, an individual sending a response text regarding a missed payment initially in the 1-30 day range may be routed to any available agent, whereas an individual sending a response text that is in the 61-90 day late range may be routed to a different group of agents. In other embodiments, the calling party number may be unique to an agent, so that a response (whether it be a voice or text response call) is routed to a particular agent. Thus, the selection of a different short code may correlate to selection of different agent groups, which correlate to different skill sets for the handling the different conditions.

Automatic Selection of Dialing Mode by Application of a Rule

Figure 12:
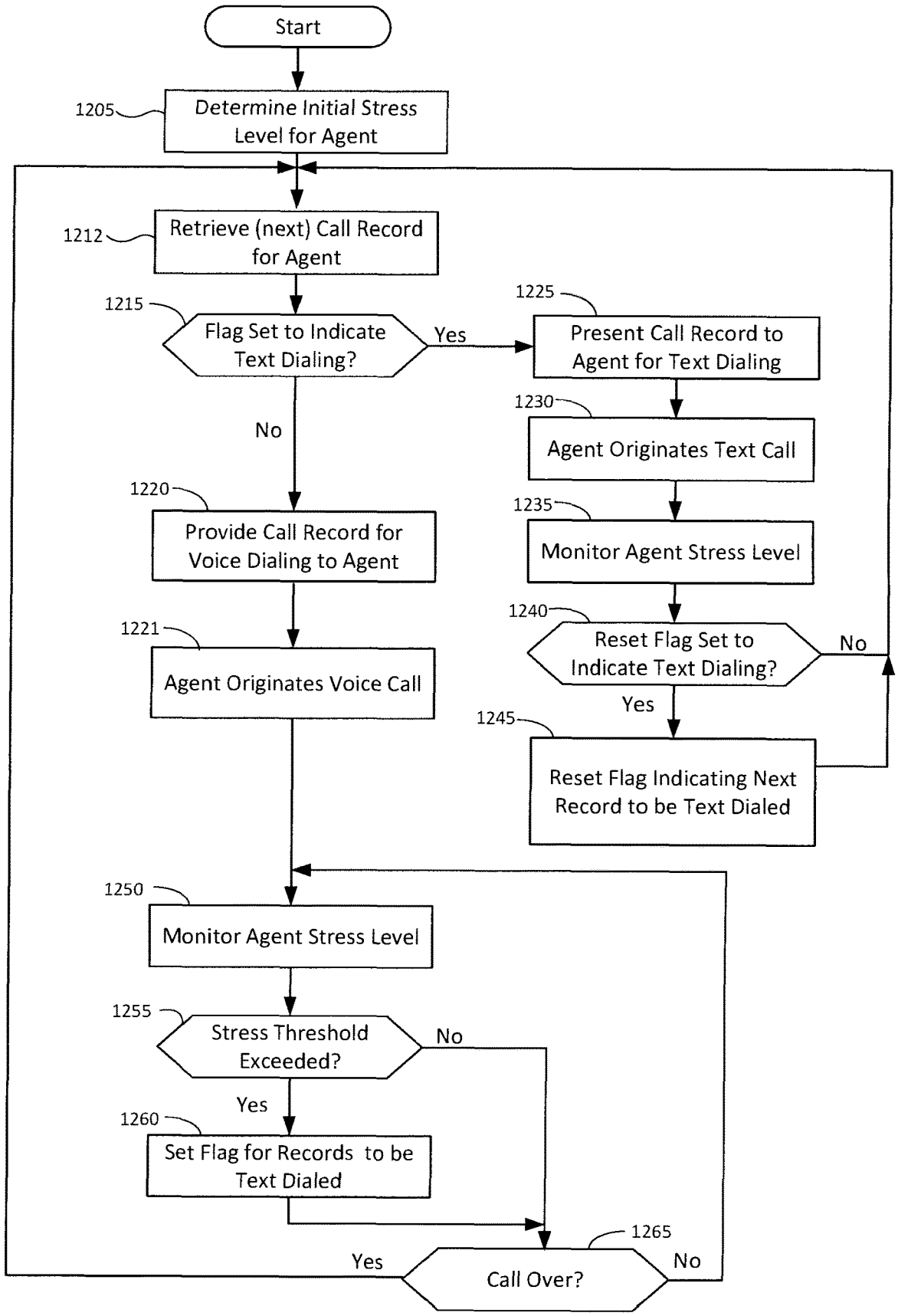
FIG. 12 illustrates an embodiment of a process flow for altering selection of a dialing mode for a call record.

FIG. 12 illustrates how a selection rule could be applied to determine the dialing mode for the next call record in the dialing list being processed, assuming that flexibility is allowed in determining how that call record may be dialed. This example illustrates the application of extrinsic information, i.e., information that is not contained within the account itself, used to determine how to determine the dialing mode. This example relies on extrinsic information about the agent to ascertain whether the agent should manually voice dial or manually text dial the next call record in the dialing list.

This process may rely on various mechanisms for measuring stress on a particular agent. For example, stress may be exhibited by an agent by their voice. Certain changes in pitch, cadence, or volume may be symptomatic of stress. Further, use of certain words in the agent's speech may be symptomatic of stress. Either form may be detected by a speech analytics system that is monitoring the speech of the agent for this and/or other purposes. In other embodiments, a desktop camera that may be integral to the agent's display device and may be used to detect stress in the agent by monitoring facial expressions or other features of the agent. This can be used to determine when the agent should not be handling voice calls and should be instead originating text calls for future call records. The system may monitor the agent's stress level in other ways, and when it returns to acceptable levels, then voice dialing may be reinstituted.

One embodiment of a process flow representing this operation is shown in FIG. 12. In this embodiment, an initial stress level of the agent is ascertained in operation 1205. Then, the next call record is retrieved for the agent in operation 1212. A determination is made whether a flag is set indicating that the record should be text dialed in operation 1215. This may be set as a default value when processing the initial record in the dialing list for that agent. If the flag is not set to indicate text dialing (i.e., the call is to be voice dialed), then the process flow continues from operation 1215 to operation 1220, where the call record is used to present the appropriate information to the agent using the voice dialing mode and associated graphical user interface, such as the one shown in FIG. 5A. The agent then originates the voice call as indicated in operation 1221.

The agent's stress level is monitored in operation 1250, which may use the aforementioned speech analytics or camera for detecting the agent's stress level. If the stress exceeds a defined threshold in operation 1255, then the flag is set to indicate that future call records are to be voice dialed in operation 1260. If the stress level is below a threshold, then the flag is not set. The process in either case continues to operation 1265, where a test is made to determine if the call is over. If the call is not completed, then the process returns to operation 1250, where the agent's stress level is monitored. This process continues until the call is over in operation 1265. At this point, the process returns to operation 1212 where the next record is retrieved and the process repeats.

Returning to operation 1215, if the flag is set to indicate the call record should be text dialed, then the process continues to operation 1225 where the current call record is presented to the agent for manual text dialing, using, for example, the aforementioned user interface of FIG. 6A. The agent after reviewing the text message may then originated the text call in operation 1230. The agent's stress level is monitored again in operation 1235. It may be that because the agent is not on a voice call, monitoring the agent's voice may not be feasible. Hence, reliance on a camera for monitoring the agent's facial expressions may be relied upon. If the stress level is such that the flag can be reset, then it is reset in operation 1245.

Miscellaneous

Various data used in processing a call record may be linked to the dialing list or campaign that the dialing list is associated with. Frequently, such data is used in processing all call records in the dialing list, and hence is usually associated with the dialing list as opposed to each of the call records in the dialing list. For reference purposes, this may be referred to as "campaign level parameters" ("CLP").

CLP data may be used to determine how particular data on the GUI is selected. For example, CLP data may indicate which calling party number or short code to use when originating a text call. The CLP may indicate a default value, which may be modified by the agent, or it may indicate a mandatory value, which cannot be modified by the agent. The set of allowable options may also be indicated by the CLP data. Further, the contents of the text message may be determined by the CLP data. For example, in one embodiment, all manually individual dialed text calls are populated with a default text message contents when the GUI is presented to the agent. Or, in another embodiment, a set of allowable text message contents are presented to the agent. See, for example, the message box 622 of FIG. 6A. In other embodiments, CLP data is used to define the format of a limited-content text messages, which follow a template that includes the agent's name, a request for the called party to call back the agent at a specified number, and include the name of the debtor. The limited-content text messages are a particular form of text messages defined by proposed regulations of the Consumer Financial Protection Bureau for how a debt collector can communicate with a debtor under certain circumstances, and those skilled in the art of debt-collection regulations will be familiar with these requirements.

CLP data may also be used to determine how the GUI functions. For example, returning to FIG. 6A, it was previously mentioned that the agent may dial the called number using the keypad 640 or that a copy function icon 608 may be used to copy the number 606 into the register 632 of the keypad 640. The CLP data may indicate whether the agent can utilize the copy function 608 or must enter the number using the keypad. In some embodiments, the CLP data may indicate that such an option is not available and only one approach can be used. The CLP data may also indicate whether the agent can invoke a function tab 510 to switch the dialing mode for the current record. The CLP data may also indicate how the GUI is to be displayed to the agent. For example, if the copy function 608 cannot be used for a campaign, then the CLP may indicate that the icon is not to be shown to the agent on the GUI.

Exemplary Computer Processing Device

Figure 13:
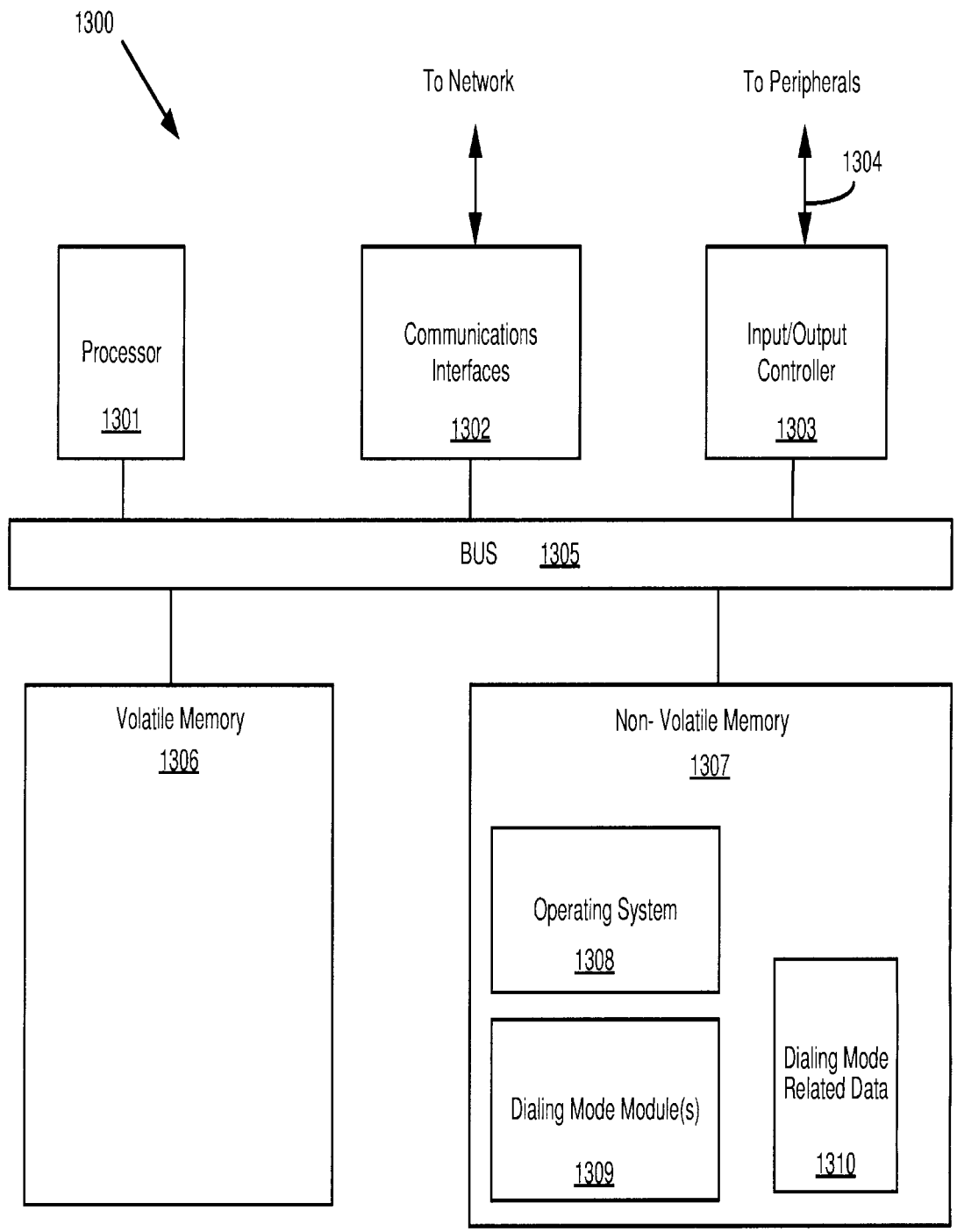
FIG. 13 illustrates one embodiment of a processing system for implementing the concepts and technologies disclosed herein.

FIG. 13 is an exemplary schematic diagram of a computer processing system that may be used in embodiments of various architectures, such as components shown in the architecture 100 of a contact center in FIG. 1 and the architecture 200 shown in FIG. 2, to practice the technologies disclosed herein. In general, the term "computer processing system" may be exemplified by, for example, but without limitation: a personal computer, server, desktop computer, tablets, smart phones, notebooks, laptops, distributed systems, servers, blades, gateways, switches, and the like, as well as any combination of devices or entities adapted to perform the functions described herein. The computer processing system may also be a specially configured system, designed to optimize the operation of the component in the contact center based in part on the specialized software configured to perform the functions disclosed herein. This may be the case for the call handler, various dialing components, SMS gateway, dialing list storage systems, etc.

As shown in FIG. 13, the processing system 1300 may include one or more computing processors 1301 that may communicate with other elements within the processing system 1000 via a bus 1005. The computing processor 1301 may be implemented as one or more complex programmable logic devices ("CPLD"), microprocessors, multi-core processors, digital signal processors ("DSP"), system-on-a-chip ("SOC"), co-processing entities, application-specific integrated circuits ("ASIC"), field programmable gate arrays ("FPGA"), programmable logic arrays ("PLA"), hardware accelerators, other circuitry, or the like.

In one embodiment, the processing system 1300 may also include one or more communications interfaces 1302 for communicating data via a network (such as LAN 170 from FIG. 1) with various external devices. In various embodiments, communication may be via wired, optical, or wireless networks (or a combination thereof). The communication may use a variety of data transmission protocols, such as fiber distributed data interface (FDDI), Ethernet, asynchronous transfer mode ("ATM"), or frame relay.

The input/output controller 1303 may also communicate with one or more input devices or peripherals using an interface such as, but not limited to: a keyboard, a mouse, a touch screen/display input, microphone, pointing device, etc. The input/output controller 1303 may also communicate with output devices or peripherals, such as displays, printers, speakers, headsets, banner displays, etc.

The computing processor 1301 may be configured to execute instructions stored in volatile memory 1306, non-volatile memory 1307, or other forms of computer readable storage media accessible to the processor 1301. The volatile memory may comprise various types of memory technologies, including, but not limited to: random access memory ("RAM"), dynamic random access memory ("DRAM"), static random access memory ("SRAM"), and other forms well known to those skilled in the art. The non-volatile memory may comprise various technologies, including, but not limited to: storage media such as hard disks, floppy disks, read only memory ("ROM"), programmable read only memory ("PROM"), electrically erasable read only memory ("EPROM"), flash memory, and other forms well known to those skilled in the art.

The non-volatile memory 1307 may store program code and data, which also may be loaded into the volatile memory 1306 at execution time. For example, the non-volatile memory 1307 may store one or more modules 1309 that may perform the above-mentioned process flows and/or operating system code 1308 containing instructions for performing the process and/or functions associated with the technologies disclosed herein. The module(s) 1309 may also access, generate, or store related data 1310, including, for example, the data described above in conjunction with dialing mode, in the non-volatile memory 1307, as well as in the volatile memory 1306. The volatile memory 1306 and/or non-volatile memory 1307 may be used to store other information including, but not limited to: records, applications, programs, scripts, source code, object code, byte code, compiled code, interpreted code, machine code, executable instructions, or the like. These may be executed or processed by, for example, the computing processor 1301 and may form a part of, or may interact with, the module(s) 1309.

The technologies described herein may be implemented in various ways, including as computer program products comprising memory storing instructions causing a processor to perform the operations associated with the above technologies. The computer program product may comprise a non-transitory (tangible) computer readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms). Such non-transitory computer readable storage media include all the above identified computer readable media (including volatile and non-volatile media), but does not include a transitory or propagating signal, nor does it encompass a non-tangible computer readable medium. Non-volatile computer readable storage medium may specifically comprise: a floppy disk, flexible disk, hard disk, magnetic tape, compact disc read only memory ("CD-ROM"), compact disc compact disc-rewritable ("CD-RW"), digital versatile disc ("DVD"), Blu-ray™ disc ("BD"), any other non-transitory optical medium, and/or the like. Non-volatile computer readable storage medium may also comprise read-only memory ("ROM"), programmable read-only memory ("PROM"), erasable programmable read-only memory ("EPROM"), electrically erasable programmable read-only memory ("EEPROM"), flash memory, and/or other technologies known to those skilled in the art.

CONCLUSION

Many modifications and other embodiments of the concepts and technologies set forth herein will come to mind to one skilled in the art having the benefit of the teachings presented in the foregoing descriptions and the associated drawings. Therefore, it is to be understood that embodiments other than the embodiments disclosed herein are intended to be included within the scope of the appended claims. Although specific terms may be employed herein, they are used in a generic and descriptive sense only and not for purposes of limitation.

The invention claimed is:

1. A system, comprising:
one or more processors; and
one or more non-transitory computer readable media comprising computer instructions which, when executed by the one or more processors, cause the one or more processors to:
retrieve a list of records, wherein each record comprises a corresponding wireless telephone number;
select a subset of records from the list of records;
determine, for at least one record in the subset of records, that a call placed to the corresponding wireless telephone number is within a compliant calling window;
provide a user interface comprising an input component for causing, for the at least one record in the subset of records, a text message to be sent to the corresponding wireless telephone number;
receive an input at the input component; and
cause, in response to the input at the input component and for the at least one record in the subset of records, a text message to be sent to the corresponding wireless telephone number.

2. The system of claim 1, wherein the subset of records is a first subset of records, the user interface is a first user interface, and the input component is a first input component, wherein the one or more non-transitory computer readable media further comprise computer instructions which, when executed by the one or more processors, cause the one or more processors to:
select a second subset of records from the list of records;
determine, for at least one record in the second subset of records, that a call placed to the corresponding wireless telephone number is within the compliant calling window;
provide a second user interface comprising a second input component for causing, for the at least one record in the second subset of records, a text message to be sent to the corresponding wireless telephone number;
receive an input at the second input component; and
cause, in response to the input at the second input component and for the at least one record in the second subset of records, a text message to be sent to the corresponding wireless telephone number.

3. The system of claim 2, wherein the first user interface is provided to a first computer, and wherein the second user interface is provided to a second computer.

4. The system of claim 1, wherein the one or more non-transitory computer readable media further comprise computer instructions which, when executed by the one or more processors, cause the one or more processors to:
determine, for the at least one record in the subset of records, that a corresponding attempt counter does not exceed a threshold attempt counter.

5. The system of claim 4, wherein the one or more non-transitory computer readable media further comprise computer instructions which, when executed by the one or more processors, cause the one or more processors to:
increment, for the at least one record in the subset of records, the corresponding attempt counter in response to causing the text message to be sent to the corresponding wireless telephone number.

6. The system of claim 1, wherein the one or more non-transitory computer readable media further comprise computer instructions which, when executed by the one or more processors, cause the one or more processors to:
receive an input indicative of a number of records to be included in the subset of records; and
select the subset of records from the list of records based on the number of records.

7. The system of claim 1, wherein the one or more non-transitory computer readable media further comprise computer instructions which, when executed by the one or more processors, cause the one or more processors to:
receive an incoming call from the corresponding wireless telephone number of a particular record in the subset of records; and
route the incoming call to an agent.

8. The system of claim 1, wherein the text message comprises a name of an agent, a name of a corresponding party associated with the corresponding wireless telephone number, and a telephone number associated with the agent.

9. A non-transitory computer readable medium comprising instructions that when executed cause one or more computer processors to:
retrieve a list of records, wherein each record comprises a corresponding wireless telephone number;
select a subset of records from the list of records;
determine, for at least one record in the subset of records, that a call placed to the corresponding wireless telephone number is within a compliant calling window;
provide a user interface comprising an input component for causing, for the at least one record in the subset of records, a text message to be sent to the corresponding wireless telephone number;
receive an input at the input component; and
cause, in response to the input at the input component and for the at least one record in the subset of records, a text message to be sent to the corresponding wireless telephone number.

10. The non-transitory computer readable medium of claim 9, wherein the subset of records is a first subset of records, the user interface is a first user interface, and the input component is a first input component, wherein the non-transitory computer readable medium further comprises instructions that when executed cause the one or more computer processors to:
select a second subset of records from the list of records;
determine, for at least one record in the second subset of records, that a call placed to the corresponding wireless telephone number is within the compliant calling window;
provide a second user interface comprising a second input component for causing, for the at least one record in the second subset of records, a text message to be sent to the corresponding wireless telephone number;
receive an input at the second input component; and
cause, in response to the input at the second input component and for the at least one record in the second subset of records, a text message to be sent to the corresponding wireless telephone number.

11. The non-transitory computer readable medium of claim 10, wherein the first user interface is provided to a first computer, and wherein the second user interface is provided to a second computer.

12. The non-transitory computer readable medium of claim 9, further comprising instructions that when executed cause the one or more computer processors to:
determine, for the at least one record in the subset of records, that a corresponding attempt counter does not exceed a threshold attempt counter.

13. The non-transitory computer readable medium of claim 12, further comprising instructions that when executed further cause the one or more computer processors to:
increment, for the at least one record in the subset of records, the corresponding attempt counter in response to causing the text message to be sent to the corresponding wireless telephone number.

14. The non-transitory computer readable medium of claim 9, further comprising instructions that when executed cause the one or more computer processors to:
receive an input indicative of a number of records to be included in the subset of records, and select the subset of records from the list of records based on the number of records.

15. A method for originating text calls in a contact center for a plurality of agents, comprising:
retrieving a list of records wherein each record comprises a corresponding wireless telephone number;
selecting a subset of records from the list of records;
determining, for at least one record in the subset of records, that a call placed to the corresponding wireless telephone number is within a compliant calling window;
providing a user interface comprising an input component for causing, for the at least one record in the subset of records, a text message to be sent to the corresponding wireless telephone number;
receiving an input at the input component; and
causing, in response to the input at the input component and for the at least one record in the subset of records, a text message to be sent to the corresponding wireless telephone number.

16. The method of claim 15, wherein the subset of records is a first subset of records, the user interface is a first user interface, and the input component is a first input component, the method further comprising:
selecting a second subset of records from the list of records;
determining, for at least one record in the second subset of records, that a call placed to the corresponding wireless telephone number is within the compliant calling window;
providing a second user interface comprising a second input component for causing, for the at least one record in the second subset of records, a text message to be sent to the corresponding wireless telephone number;
receiving an input at the second input component; and
causing, in response to the input at the second input component and for the at least one record in the second subset of records, a text message to be sent to the corresponding wireless telephone number.

17. The method of claim 16, wherein the first user interface is provided to a first computer, and wherein the second user interface is provided to a second computer.

18. The method of claim 15, further comprising:
determining, for the at least one record in the subset of records, that a corresponding attempt counter does not exceed a threshold attempt counter.

19. The method of claim 15, further comprising:
incrementing, for the at least one record in the subset of records, a corresponding attempt counter in response to causing the text message to be sent to the corresponding wireless telephone number.

20. The method of claim 15, further comprising:
receiving an input indicative of a number of records to be included in the subset of records; and
selecting the subset of records from the list of records based on the number of records.

* * * * *